United States Patent [19]

Belsan et al.

[11] Patent Number: 5,403,639
[45] Date of Patent: Apr. 4, 1995

[54] FILE SERVER HAVING SNAPSHOT APPLICATION DATA GROUPS

[75] Inventors: Jay S. Belsan; Jeffrey S. Laughlin, both of Nederland; Mogens H. Pedersen, Longmont; Robert J. Raicer, Niwot; George A. Rudeseal, Boulder; Charles P. Schafer, Louisville; Barbara L. Steele, Boulder; Patrick J. Tomsula, Arvada, all of Colo.

[73] Assignee: Storage Technology Corporation, Louisville, Colo.

[21] Appl. No.: 939,312

[22] Filed: Sep. 2, 1992

[51] Int. Cl.$^6$ ............................................. G06F 15/40
[52] U.S. Cl. ................................ 395/600; 395/425; 395/800; 395/650; 364/DIG. 2
[58] Field of Search ............... 395/600, 425, 800, 650, 395/400

[56] References Cited

U.S. PATENT DOCUMENTS

| | | | |
|---|---|---|---|
| 4,627,019 | 12/1986 | Ng | 395/425 |
| 5,124,987 | 6/1992 | Milligan et al. | 371/10.1 |
| 5,155,835 | 10/1992 | Beisan | 395/425 |
| 5,193,184 | 3/1993 | Belsan et al. | 395/600 |
| 5,210,866 | 5/1993 | Milligan et al. | 364/DIG. 2 |
| 5,212,789 | 5/1993 | Ragu | 395/600 |
| 5,239,659 | 8/1993 | Rudeseal et al. | 395/800 |
| 5,247,647 | 9/1993 | Brow et al. | 395/600 |
| 5,278,979 | 1/1994 | Foster et al. | 395/600 |
| 5,287,496 | 2/1994 | Chen et al. | 395/600 |

*Primary Examiner*—Thomas G. Black
*Assistant Examiner*—Cuan Pham
*Attorney, Agent, or Firm*—Duft, Graziano & Forest

[57] ABSTRACT

This file server system appears to the host computer to be a plurality of data storage devices which are directly addressable by the host computer using the native data management and access structures of the host computer. The file server however is an intelligent data storage subsystem that defines, manages and accesses synchronized sets of data and maintains these synchronized sets of data external from the host computer system's data management facilities in a manner that is completely transparent to the host computer. This is accomplished by the use of the snapshot application data group that extends the traditional sequential data set processing concept of generation data groups.

42 Claims, 19 Drawing Sheets

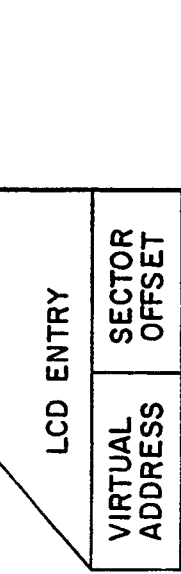

LOGICAL CYLINDER DIRECTORY (LCD)

| LOGICAL CYLINDER SEQUENCE NUMBER | LOGICAL ADDRESS | LCD ENTRY COUNT | LOGICAL CYLINDER COLLECTION HISTORY | LCD ENTRY | LCD ENTRY | LCD ENTRY | LCD ENTRY | LCD ENTRY | LCD ENTRY |

LCD ENTRY

| VIRTUAL ADDRESS | SECTOR OFFSET |

FIG. 12.

FREE SPACE DIRECTORY ENTRY

| BYTE 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FREE SECTOR COUNT | FORWARD POINTER | | BACKWARD POINTER | | FLAG BYTE (LCT) | ACCESS CNTR | CREATION TIME/DATE | | | | LAST ACCESS TIME/DATE | | | | |

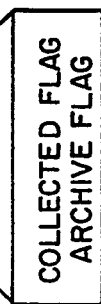

COLLECTED FLAG
ARCHIVE FLAG

FIG. 14.

FILE SERVER HAVING SNAPSHOT APPLICATION DATA GROUPS

FIELD OF THE INVENTION

This invention relates to file servers and, in particular, to a file server system that creates and manages copies of data made external to a host processor.

PROBLEM

It is a problem in data storage subsystems to define, manage and access copies of data for a host processor. Intelligent data storage subsystems function to manage the data stored therein independent of the host processor in order to relieve the host processor of the burden of attempting to track the physical location of each data record stored in the data storage subsystem. This problem is further exacerbated by the creation of copies of data records in the data storage subsystem, especially when these copies are made independent of the host processor.

Data records are typically copied for a number of reasons, such as disaster backup, test and development of software, multiple concurrent user access, etc. The copy of a data record represents the original data record as it existed at a predefined point in time. In backup applications, copies of data records are periodically made to ensure the integrity of the data records, since backup copies are made on a regular basis. The risk of data loss is thereby minimized and restricted to the changes that have taken place since the last backup. A more complex problem is file concurrency wherein a plurality of users on a multi-user system each access a shared data record. The data storage subsystem typically makes a copy of the original data record for each of these users and then must manage this plurality of copies and the changes made thereto in order to safeguard the integrity of the original data record and properly name and manage any new or varied data records created therefrom.

The data record management problem is further complicated by the fact that in today's integrated applications, data is often more than a single data set or database. Data is more typically a set of related data sets and/or databases which must be correctly synchronized in time to ensure consistency of the set of data records. If the various data sets and/or databases are not properly synchronized, then the applications using the data will potentially make logical errors. Examples of this are the use of databases that create adjunct files consisting of indexing information, files consisting of report formats and user workspace. All of these diverse files must be properly synchronized or the entirety of the data becomes unusable.

Therefore, in data storage subsystems, copies of data records must be made accessible to the end user in a computing environment that may be homogeneous or heterogeneous. This capability must be provided without requiring modifications to the host computers or their proprietary data access methods. However, there presently exists no data storage subsystem that can define sets of data records and manage copies of them external to the host computer in a manner that is transparent to the host computer and ensures the integrity of the sets of data records.

SOLUTION

The above described problems are solved and a technical advance achieved in the field by the file server system having snapshot application data groups. This file server system appears to the data processor(s) to be a plurality of data storage devices that are directly addressable by each data processor using the native data management and access structures of the data processor. The file server system operates independent of the data processor(s) and can operate in a data storage environment that includes heterogeneous data storage media as well as heterogeneous data processors. The file server system is an intelligent data storage subsystem that defines, manages and accesses synchronized sets of data and maintains these synchronized sets of data external from the data processors' data management facilities in a manner that is completely transparent to the data processor(s). The data storage and management capability can include changing the format of the data stored to accommodate various combinations of heterogenous data processors.

This is accomplished by the use of the snapshot application data group that extends the traditional sequential data set processing concept of generation data groups. The snapshot application data groups allow the end user to define a set of data sets and/or databases that must be synchronized in time. The snapshot application data group then allows the end user to reference that set of data sets as a single entity for creation, access and deletion operations. It also provides a mechanism for managing resources consumed by the copies of the data that are created within the file server system.

In one embodiment of the present invention, a disk array data storage subsystem is used to illustrate the concept of snapshot application data groups. The disk array data storage subsystem comprises a plurality of small form factor disk drives that are interconnected into redundancy groups, each of which contain n+m disk drives for storing n segments of data and m redundancy segments in order to safeguard the integrity of the data stored therein. Each redundancy group functions as a large form factor disk drive which image is presented to the host processor. The disk array subsystem provides internal control hardware and software to map between the virtual device image as presented to the data processor and the physical devices on which the data records are stored. This mapping consists of tables of pointers that are addressable by the data storage subsystem using the virtual image presented to the data processor and which pointers denote the physical storage location in the plurality of disk drives in a selected redundancy group that contains the desired data record.

This data storage subsystem includes a snapshot copy capability that creates copies of data records instantaneously by simply replicating pointers. In particular, when a copy of a data record is to be made, a new pointer is created, addressable at the new virtual address assigned to this copy of the data record, which pointer points to the same physical storage location in the data storage subsystem as the original data record. Therefore, the data storage subsystem simply replicates the pointer from the mapping table that points to the original set of data and assigns a new virtual address to this replicated pointer to enable the data processor to access the original data record at two different virtual addresses. A physical copy of this data record is created only when the data processor makes changes to this data record or for backup purposes, or if the server repositions the physical data to another media, e.g. for performance reasons. Alternatively, the user may specify that the two copies must remain synchronized. In this case, the two different pointers will always reference the same physical data. This enables multiple user programs (potentially on different processors) to access a common, single physical copy of data via different logical copies.

The snapshot application data group makes use of this capability or an equivalent network functionality to make a copy of a set of data sets that are synchronized at a particular instant in time. This new copy is an instance of a snapshot application data group generation. The set of data sets may constitute a portion of a single volume or it may consist of one or more volumes whose data needs to be synchronized for recovery and data processor access purposes. This copy of the set of data sets is not accessible via the data processor's normal access methods, because the data processor retains knowledge of only the original source set of data sets on the original source virtual volumes. The file server system snapshot application data group manager retains the knowledge of the copied volumes, the user designation for these copied volumes and specific access information, including the mapping information indicative of the physical storage location on the disk drives in a redundancy group wherein the data is stored. The media used to store the data can be a disk array or any other media or combinations of media such as a disk array in combination with a backend automated magnetic tape cartridge library system, including a plurality of tape drives such that the file server system comprises a hierarchical data storage system containing multiple types of media.

BRIEF DESCRIPTION OF THE DRAWING

FIG. 12 illustrates the format of the Logical Cylinder Directory;

FIG. 14 illustrates a typical free space directory entry;

DETAILED DESCRIPTION OF THE DRAWING

Figure 1:
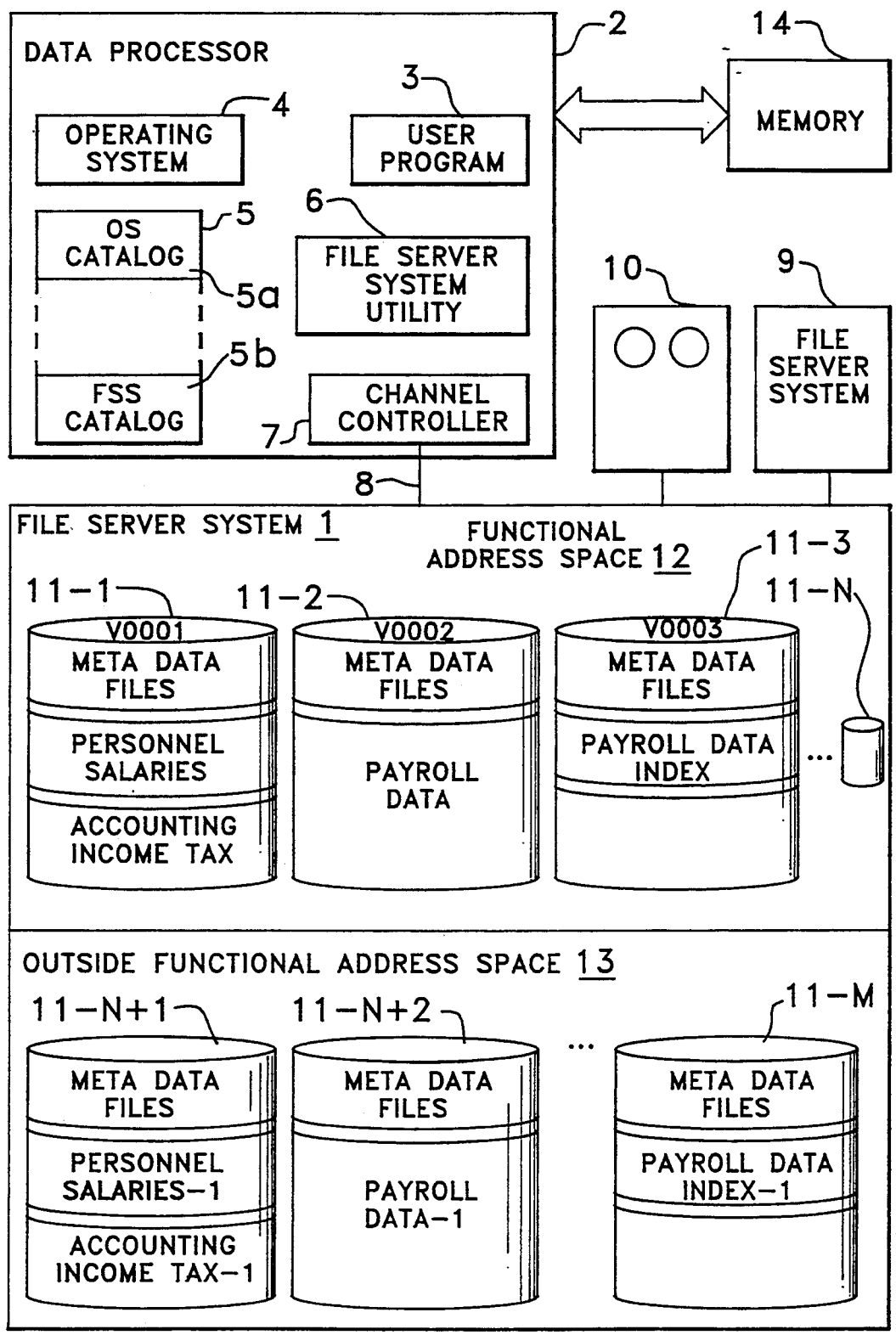
FIG. 1 illustrates in block diagram form the overall architecture of a file server having snapshot application data groups.

FIG. 1 illustrates in block diagram form the overall architecture of the file server system 1 of the present invention. The file server system 1 is connected to at least one data processor 2 by a data channel 8 which functions to exchange data and control information between the data processor 2 and the file server system 1. Within the data processor 2 is resident an operating system 4 as well as a plurality of user programs 3. In addition, a catalog structure 5 is provided either in the data processor 2 or resident on a memory device 14 connected to the data processor 2. The catalog structure 5 consists of data that is used to map between the virtual address of a particular data set (also referred to as data record) and the physical location on a data storage device on which the data record is stored. The file server system 1 itself consists of a plurality of data storage devices 11-* that are used to store the data records for access by the data processor 2. As can be seen from FIG. 1, the data storage devices 11-* in the file server system 1 are divided into two groups: data storage devices 12 within the functional address space of the data processor 2, and data storage devices outside the functional address space 13 of the data processor 2. In particular, a data processor 2 can directly address N functional volumes (11-1 to 11-N) of data storage capacity while the file server system 1 can be equipped with M functional volumes 11-* of data storage capacity where M>N. Therefore, the directly addressable memory space available to the data processor 2 is typically less than that provided by the file server system 1. Furthermore, the directly addressable functional volumes (11-1 to 11-N) in the file server system 1 must include a plurality of functional volumes that are used as scratch functional volumes to enable the user programs 3 on the data processor 2 to read and write data thereon. Therefore, the memory address space seen by the data processor 2 consists of only a fraction of the memory capability of the file server system 1. The additional capability of the file server system 1 can therefore be used to store backup copies of the data that is directly addressable by the data processor 2.

File server system 1 operates independent of data processor 2 to manage the storage of data records external to data processor 2 and in a data storage media environment that can be heterogeneous. Multiple types of media can be included within or connected to file server system 1: rotating media data storage devices 11-*, mountable media data storage devices 10 (magnetic tape), or other file server systems 9. File server system 1 dynamically maps the data records identified by data processor 2 into physical storage locations on the data storage media within file server system 1. This mapping can include compression of the data received from data processor 2 and even changing the format of the data for storage on the data storage media. The dynamic mapping of the data processor 2 address space is accomplished by either modifying operating system 4 to directly manage the data storage, or by including utilities on data processor 2 to correct meta data used to access the data, such as the volume table of contents, or by including a file server system utility 6 on data processor 2 to intercept the data processor input/output commands and managing the input/output in file server system 1. The file server system utility 6 is the preferred embodiment and the result of this structure is to present a uniform data storage volume image to data processor 2 in a manner that is transparent to data processor 2. The image can be that of "mountable DASD" wherein file server system 1 provides data processor 2 with access to data storage capacity that exceeds the address capacity of data processor 2. In addition, file server system 1 can store data on backend media and then stage data requested by data processor 2 to cache memory or to data storage media directly addressable by data processor 2.

Overview of Data Read/Write Operations

Figure 19:
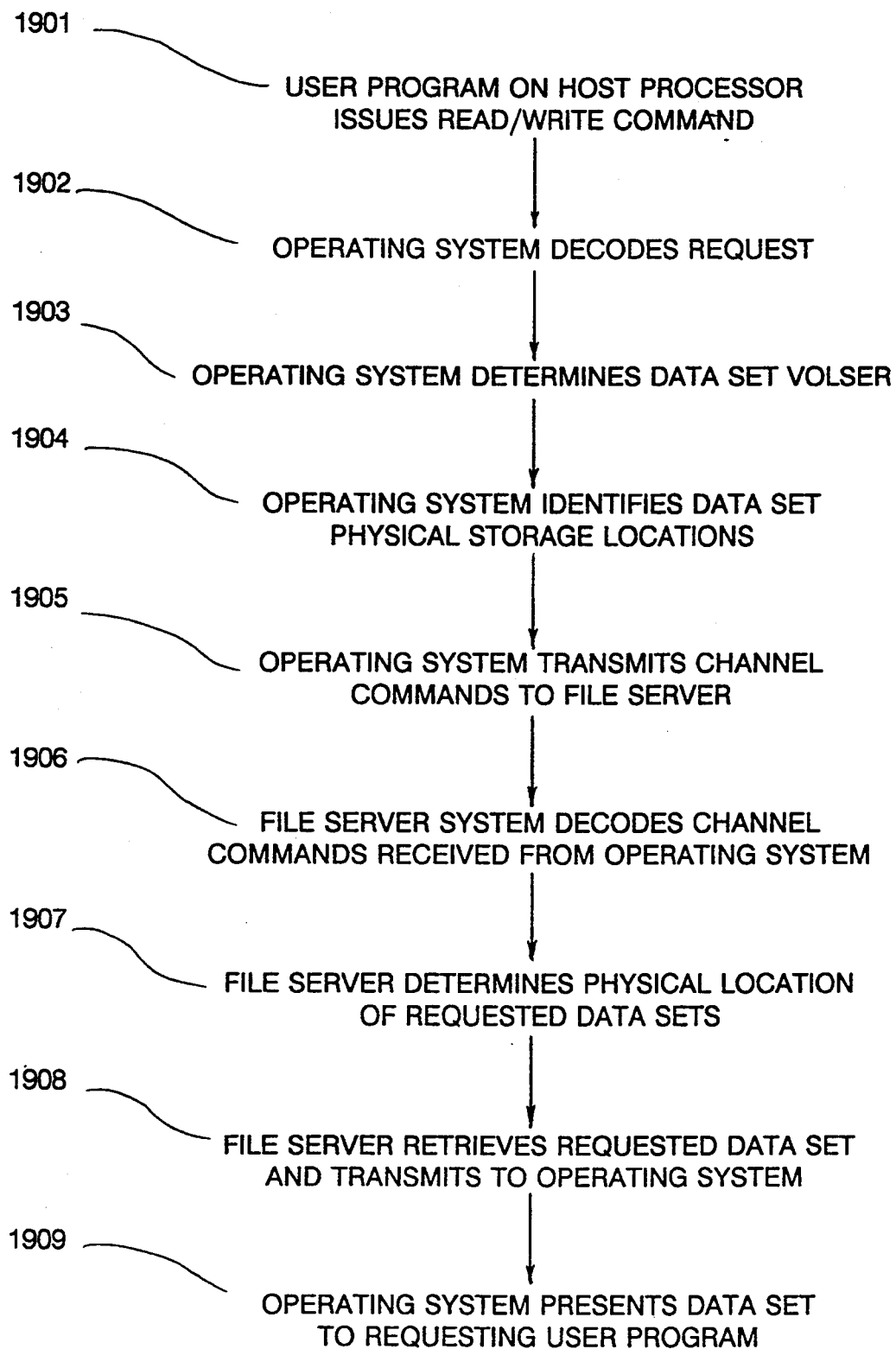
FIG. 19 illustrates in flow diagram form the operational steps taken in a data processor file server read and write interaction.

In order to better understand the operation of this apparatus, FIG. 19 illustrates in flow diagram form the operational steps taken by the apparatus illustrated in FIG. 1 to read and write data from the data processor 2 on the file server system 1. At step 1901, a user program 3 resident on data processor 2 issues a read or a write command. The operating system 4 at step 1902 receives the request from the user program 3 and interprets the request to determine what action is required to satisfy this request. At step 1903, the operating system 4 determines the virtual address, e.g. the volume serial number on which they reside, of the data records that are requested by the user program 3. The virtual address is obtained from the catalog structure 5. The catalog structure 5 can consist of multiple levels of information 5a that translate the virtual address provided by the user program 3 into an identification of a device or a functional volume within the file server system 1 that contains the requested data record. Additional physical location identification information 5b may be stored in the catalog 5 and maintained by file server system utility 6 to indicate a particular track and cylinder on the data storage device that contains the data record that has been requested by the user program 3. Alternatively, the data storage device itself may contain a level of catalog information that specifically points to the physical location on the data storage device of the requested data record. The physical location is determined by the operating system 4 at step 1904 by translating the virtual address of the requested data record into a physical location indicia.

In either case, at step 1905, the operating system 4 builds a channel command, or other network request for data, which consists of a command of predetermined format that is used to indicate to the file server system 1 the nature of the request from the data processor 2 and specific data relating to this request that enable the file server system 1 to satisfy the request. In the case of a data record read command, the channel command is identified through its data content as being a data record read request and additional information is provided in the channel command to identify the virtual address and the specific physical location of the requested data record. At step 1906, the operating system 4 issues the channel command to the channel controller 7 which transmits the channel command over the data link 8 to the file server system 1 to obtain the data records stored therein. At step 1906, the file server system 1 decodes the received channel command to determine the nature of the command and the physical location of the requested data record. Since this is a data record read request, the file server system 1 identifies the functional volume that is identified by the data processor channel command and uses the information contained in the channel command to either directly locate the requested data record or access further catalog information stored in the file server system 1 to identify the physical storage location in the file server system 1 that contains the requested data record. The file server system 1 retrieves the requested data record from its identified physical storage location and transmits the data and a response channel command over the data channel 8 to the data processor 2 at step 1908. At step 1909, the operating system 4, in response to the data transmitted by the file server system 1, returns the data to the user program 3 for use therein.

It is obvious in this high level functional description that the generic process described herein is presently in use but suffers from the limitation that the data processor 2 must manage all of the data records that are stored on the file server system 1. This represents a processing burden on the host processor 2 and significantly limits the amount of memory that can be accessed by the data processor 2 and used to store the data records that are accessible by the user programs 3 resident on the data processor 2.

Generation Data Groups

As can be seen from the architecture of FIG. 1, the address space within the file server system 1 is of greater extent than that directly addressable by the data processor 2. As noted above, the data processor 2 can directly address N functional volumes while the file server system 1 consists of a memory capacity of M functional volumes where $M > N$. The use of a file server system 1 that operates independent of the data processor 2 to manage the data records stored therein is of significant benefit to the capability of the data processor 2 especially where the file server system 1 automatically manages backup data for the active functional volumes (11-1 to 11-N) that are used by the data processor 2. The user programs 3 on the data processor 2 typically make use not of a single data set but sets of data sets wherein a plurality of data sets or data records must be concurrently managed in order to ensure the integrity of the data contained therein. An example of such an application is the use of a database wherein the raw data can be stored in one functional volume 11-2 in the file server system 1 while the indexing information to cross reference the data that is stored in the database system can stored on yet another functional volume 11-3 in the file server system 1. Furthermore, preformatted standard report programs can also be stored on the file server system 1 on different functional volumes 11-1 therein. Therefore, it is obvious the sets of data sets can be scattered throughout many functional volumes in the file server system 1 and all of these data sets in the set of data sets must be temporally concurrent in order to prevent the corruption of the data that is stored therein.

A well known functional capability presently found in computer systems in the generation data group. The generation data group is a data management methodology that automatically maintains a predetermined number of most recent versions of a data record. The most recent version of a data record is generally assigned a relative version number of 0 while the last most recent version of the same data record is assigned the relative version number-1. It can be seen from this methodology that a user can define the number of vintages of data that is to be saved on the file server system by simply defining the maximum relative version number that the file server system 1 can store. By setting this threshold number, the file server system 1 can automatically discard the oldest version of this data record when a new version is created by a user program 3 on the data processor 2. This enables the file server system 1 to automatically maintain a predetermined number of prior copies of the data record. Furthermore, the file server system 1 can automatically archive a predetermined old version of the data record when a new version of the data record is created. Therefore, an example where the file server system 1 maintains three versions of a data record, when the user program 3 on the data processor 2 creates a new version of the data record, the oldest or fourth version of the data record that presently is stored on the file server system 1 can be transmitted to an archive memory that is part of the file server system 1 or an adjunct system connected thereto for automated archiving while the file server system 1 updates the version number of the remaining three copies of the data record stored therein and assigns the new version of the data record received from the data processor 2 the relative version 0 tag. In order for the file server system 1 to most expeditiously manage the plurality of versions of data records that is stored therein, a snapshot copy capability is utilized to quickly make copies of data records and to dynamically move the data records using a pointer redirection scheme that is described in detail below. Furthermore, when a data record on a functional volume is to be replicated, the address mapping must also be replicated so that the snapshot volume is identical to the original functional volume that is directly addressable by the data processor 2.

The file server system 1 operates independent of the data processor 2 and directly manages all of the data records stored therein. By making use of data record pointer information to manage the placement of data records in the copying of these data records, the file server system 1 can quickly transfer files from the functional address space accessible by the data processor 2 to the functional address space that is outside the addressing range of the data processor 2 by simply managing the pointers that reference the physical locations on the data storage devices 11-* contained in the file server system 1. Therefore, without having to physically relocate the data record on the devices contained in the file server system 1, the file server system 1 can effectively accomplish an instantaneous move or copy of a data record in a manner that appears to the data processor 2 to be a physical movement or replication of the data record from one physical device to another physical device even though the data record is not moved and the pointers thereto are simply managed by the file server system 1. The file server system 1 maintains a dynamic mapping that is transparent to the data processor 2 and redirects a data record to a physical memory location on a data storage device contained within the file server system 1 not as a function of host processor commands but as a function of the mapping memory contained within the file server system 1. The data processor 2 is totally unaware of the mapping and data management that takes place within the file server system and this obviates the need for the data processor 2 to attempt to manage the data records that are stored on the file server system 1.

The preferred embodiment of the file server system 1 disclosed herein below is that of a disk array data storage subsystem 100 illustrated in FIG. 2. The disk array data storage subsystem 100 includes an import/export control unit 208-* that interconnects data storage subsystem 100 with additional data storage devices. In the embodiment illustrated in FIG. 2, data storage subsystem 100 has connected thereto a archive memory 10 which in the preferred embodiment is disclosed as a tape drive subsystem that can be an automated magnetic tape cartridge library system to store and retrieve a large number of magnetic tape cartridges 10a, 10b. It is obvious that the specifics of this implementation are but one embodiment that can be used to provide the file server system capability as generally described herein. The disk array data storage subsystem 100 is selected for the preferred embodiment due to its dynamic mapping of virtual devices wherein the virtual device image presented to the data processor 2 is simply an emulation and the data is stored on physical devices in a manner known only to the data storage subsystem 100 rather than the data processor 2.

Data Storage Subsystem Architecture

Figure 2:
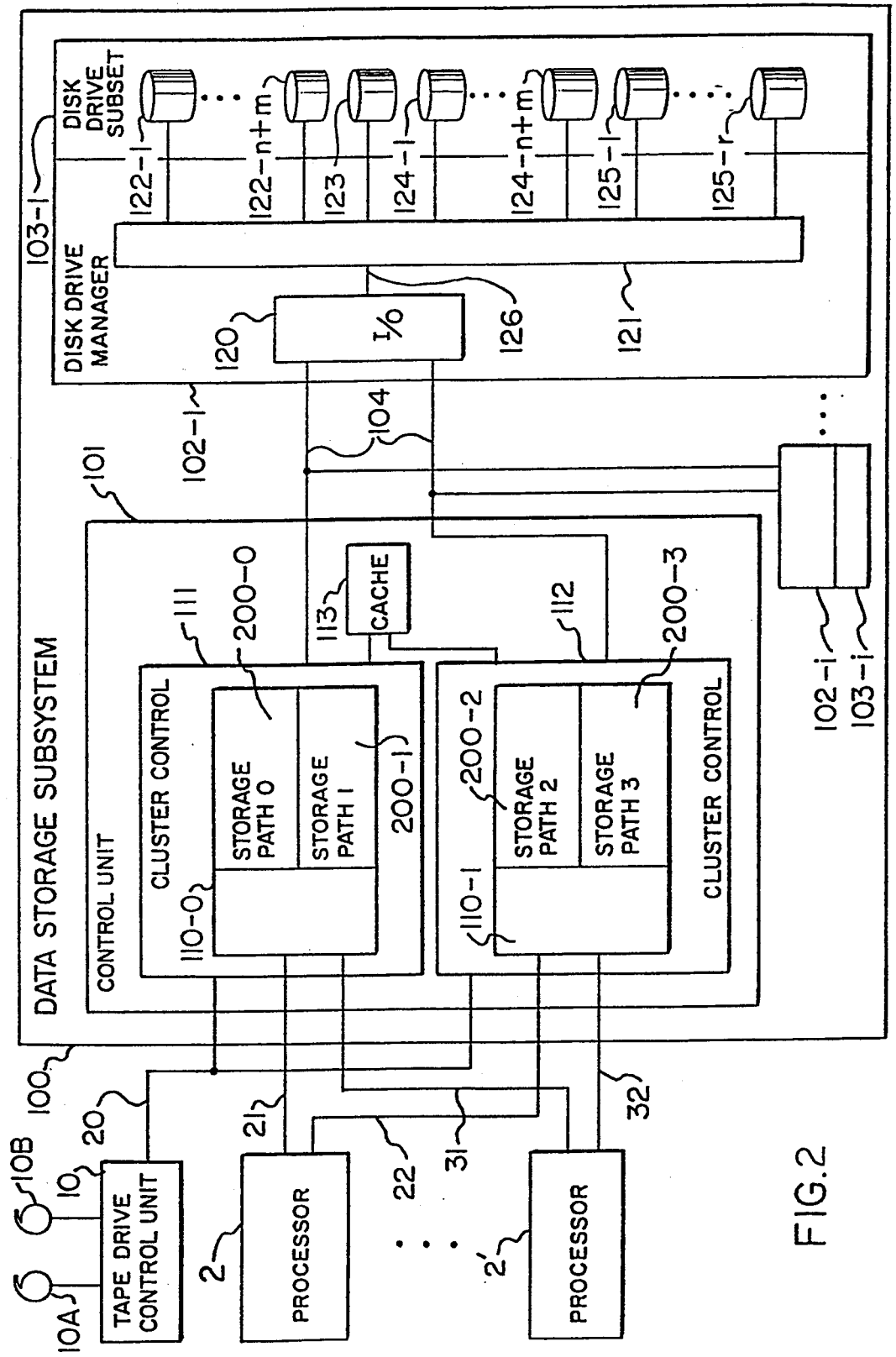
FIG. 2 illustrates an overall block diagram of a disk array data storage subsystem.

FIG. 2 illustrates in block diagram form the architecture of the preferred embodiment of the data storage subsystem 1, including disk drive array data storage subsystem 100. The disk drive array data storage subsystem 100 appears to the associated host processors 11-12 to be a collection of storage devices, such as large form factor disk drives with their associated storage control, since the architecture of disk drive array data storage subsystem 100 is transparent to the associated data processors 2 - 2'. This disk drive array data storage subsystem 100 includes a plurality of disk drives (ex 122-1 to 125-r) located in a plurality of disk drive subsets 103-1 to 103-i. The disk drives 122-1 to 125-r are significantly less expensive, even while providing disk drives to store redundancy information and providing disk drives for spare purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 2 is that of a plurality of data processors 2 - 2' interconnected via the respective plurality of data channels 21, 22–31, 32, respectively to a data storage subsystem 100 that provides the backend data storage capacity for the data processors 2 - 2'. This basic configuration is well known in the data processing art. The data storage subsystem 100 includes a control unit 101 that serves to interconnect the subsets of disk drives 103-1 to 103-i and their associated drive managers 102-1 to 102-i with the data channels 21 - 22, 31 - 32 that interconnect data storage subsystem 100 with the plurality of data processors 2 - 2'.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel ex-21 from any data processor 2 to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101.

The data that is written onto the disk drives in disk drive subset 103-1 consists of data that is transmitted from an associated data processor 2 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more storage devices, e.g. large form factor disk drives (ex—an IBM 3380 K type of disk drive), using a plurality of smaller form factor disk drives while providing a high system reliability capability by writing the data across a plurality of the smaller form factor disk drives. A reliability improvement is also obtained by providing a pool of R spare disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 3:
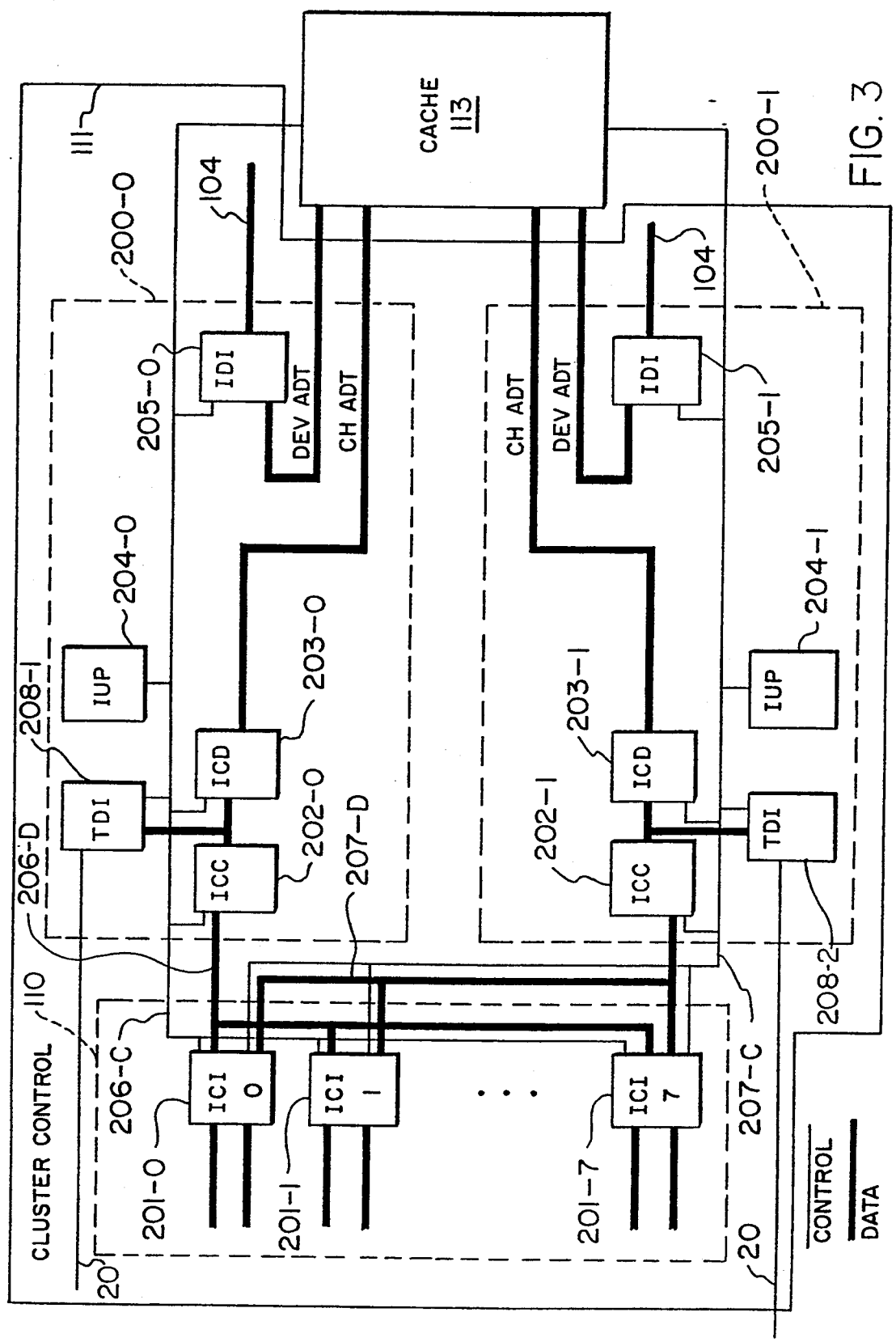
FIG. 3 discloses additional details of the storage control unit of the disk array data storage subsystem.

FIG. 3 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 3, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated data processor 2 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and the one of channel interface units 201 that is presently active within storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the data processor 2. It also performs the necessary decompression operation for control unit 101 on a data read operation by the data processor 2.

As can be seen from the architecture illustrated in FIG. 2, all data transfers between a data processor 2 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Data Compression Capabilities

Data stored on disks and tapes or transferred over communication links in a computer system generally contains significant redundancy. Data compression algorithms improve the efficiency with which data is stored or transmitted by reducing the amount of redundant data. A compression algorithm takes a source text as input an produces a corresponding compressed text. An expansion algorithm takes the compressed text as input and produces the original source text as an output. There are four types of redundancy that are typically found in a data file. The first type of redundancy is character distribution redundancy. In a typical character string, some characters are used more frequently than others. Specifically, the eight bit ASCII representations used to encode characters are not all used in a typical character string. Nearly three fourths of the possible 256 characters representations may not be used in a specific file. Consequently, nearly two bits of each eight bit representation could be removed without affecting the data content of the character string. This is a twenty-five percent savings in space and encoding time. The second type of redundancy is character repetition redundancy. When a string of repetitions of a single character occurs, the message can be encoded more compactly than by just repeating the character symbol. The character repetition strings are infrequent in text but fairly common in formatted business files where unused space is very common. In addition, graphical images contain a significant amount of character repetition redundancy. A third form of redundancy consists of high usage patterns. Certain sequences of characters appear with relatively high frequency in a particular data file and therefore can be represented with relatively fewer bits for a net savings in data storage space and string encoding time. Thus, frequently occurring patterns are encoded using fewer bits while infrequently occurring patterns are encoded using more bits. The fourth type of redundancy is positional redundancy. If certain characters appear consistently at a predictable place in each block of data, then the characters are at least partially redundant. An example of positional redundancy are charts and pictures.

The most popular method of data compression is Huffman type coding which translates fixed sized pieces of input data into variable length symbols. The Huffman encoding procedure assigns codes to input symbols such that each code length is proportional to the probability of the symbol occurring in the data. In normal use, the size of the input symbols is limited by the size of the translation table needed for compression. That is, a table is needed that lists each input symbol and its corresponding code. A second problem with Huffman encoding is the complexity of the decompression process. The length of each code to be interpreted for decompression is not known until the first few bits are interpreted. An improvement over Huffman coding is an adaptive compression algorithm such as the Lempel-Ziv category of algorithms that converts variable length strings of input symbols into fixed length codes. This form of data compression is effective at exploiting character frequency redundancy, character repetition redundancy, and high usage pattern redundancy but is not generally effective on positional redundancy. This algorithm is adaptive in the sense that it starts each field with an empty table of symbol strings and builds the table during both the compression and decompression processes. These are one PASS procedures that require no prior information about the input data statistics and execute in time proportional to the length of the message.

The length of a compressed image for a given message is unpredictable because it depends on the content of the message. There is no assurance prior to data compression that a message will compress at all; in some cases it may even expand. Therefore, the space allocated for the compressed image must be at least as big as the space allocated for the original message. In addition, an update to a data record that alters just a few characters of the data record can change the compressed size and may result in a required change in allocation even for a minor update. Therefore, the above-described process used by data storage subsystem 100 to perform modifications to data records overcomes this minor update impact on compressed data, since a modified data record is always written to an empty logical cylinder and the old version of the data record is flagged as obsolete.

Data Compaction

As a data record is received from data processor 2 by channel interface control 202-0, and buffered therein, processor 204-0 deletes all gaps between fields in the received count key data record. The virtual device and virtual cylinder addresses are extracted from the count key data format data record and used to create an entry in the virtual cylinder directory stored in cache memory 113. The data fields of the received data record are forwarded to channel data compression circuit 203-0 for compression and temporary storage in cache memory 113. Thus, all that is stored in the redundancy groups are logical cylinders of compressed data in fixed block architecture format since the headers, gaps and received space in the received count key data are deleted. A further compaction process is the creation of null virtual tracks. Each time data processor 2 creates a new instance of a data file, a predetermined data file extent is reserved by data processor 2. Channel interface control 202-0 and processor 204-0 eliminate the need to reserve this unused memory space by simply creating a series of null entries in the virtual track directory; no data is written to a redundancy group.

Adaptive Data Compression Function

The adaptive data compression apparatus 203-0 is located within control unit 101, which is interposed between a plurality of host processor channel interface units 201 and cache memory 113. The adaptive data compression apparatus 203-0 functions to efficiently compress the records of a user data file received from the data processor 2 into a bit oriented compressed format for storage in cache memory 113 and disk drives 122. The data compression apparatus 203-0 divides each record of an incoming stream of data records into predetermined sized segments, each of which is compressed independently without reference to any other segment in the stream of data records. The data compression apparatus 203-0 concurrently uses a plurality of data compression algorithms to adapt the data compression operation to the particular data stored in the user data record. A cyclic redundancy check circuit is used to compute a predetermined length CRC code from all of the incoming user data bytes before they are compressed. The computed CRC code is appended to the end of the compressed data block.

The data compression apparatus 203-0 operates by converting bytes and strings of bytes into shorter bit string codes called reference values. The reference values replace the bytes and strings of bytes when recorded on the disk drives 122. The byte strings have two forms, a run length form for characters that are repeated three or more times, and a string form that recognizes character patterns of two or more characters. Two variables are used to indicate the maximum and minimum byte values in a particular segment.

Strings of two or more bytes are compressed by assigning a reference value to each defined string using an adaptive data compression algorithm. Subsequent occurrences of that string are replaced by its string reference value. Strings are constructed a character at a time, where a previously defined string plus the next user data byte defines a new string and is assigned the next previously undefined reference value. Thus, strings become longer and data compression more efficient as more user data bytes in the segment are examined. However, as more strings are defined, greater length reference values are needed to uniquely identify a string, reducing the efficiency of the compression process. This factor makes it desirable to divide a data record into segments which are compressed independently. String definition occurs by combining the last used reference value with the next user data byte from the input data stream, then searching to see if this string has been previously defined. If it has, the next byte is concatenated to this new byte string reference value and a search is again conducted to see if this extended byte string has been previously defined as a string. This sequence is continued until a string is located that has not been previously defined. The last used defined string reference value is put in the compressed output data stream and the next previously undefined reference value is assigned to define the last string that was not found. The search procedure is initiated over again starting with the most recently used user data byte.

Runs of three or more repeated bytes are encoded using a predetermined set of reserved reference values to indicate that the preceding character was repeated the number of times specified by the repeat code. The immediately preceding character is not re-included in the repeat count. Run length encoding takes precedence over string data compression. Run length encoding, single byte compression, and string data compression are intermixed in any compressed segment within the user data record.

If the size of a compressed segment in bytes is larger than its size before compression then the segment is not compressed and is recorded in uncompressed format.

Import/Export Control Unit Interface

The file server system 1 can include several types of media and these can be disk drives 12*-* of differing format and capacity or even different media, such as tape 10, connected to data storage subsystem 100 via an import/export interface unit 208-*. Data records can be migrated or copied, either automatically within file server system 1 or by command from data processor 2 between data storage subsystem 100, a similar subsystem at another location, and/or tape drive control unit 10. In the particular embodiment disclosed herein, a tape drive control unit 10 is described, but it is understood that import/export interface unit 208-* can be connected to any data storage media or to a network that can be used to access data storage media. This data storage media can be collocated with data storage subsystem 100 or can be spatially disjunct therefrom as in the case of a geographically distant secure archive facility.

Figure 16:
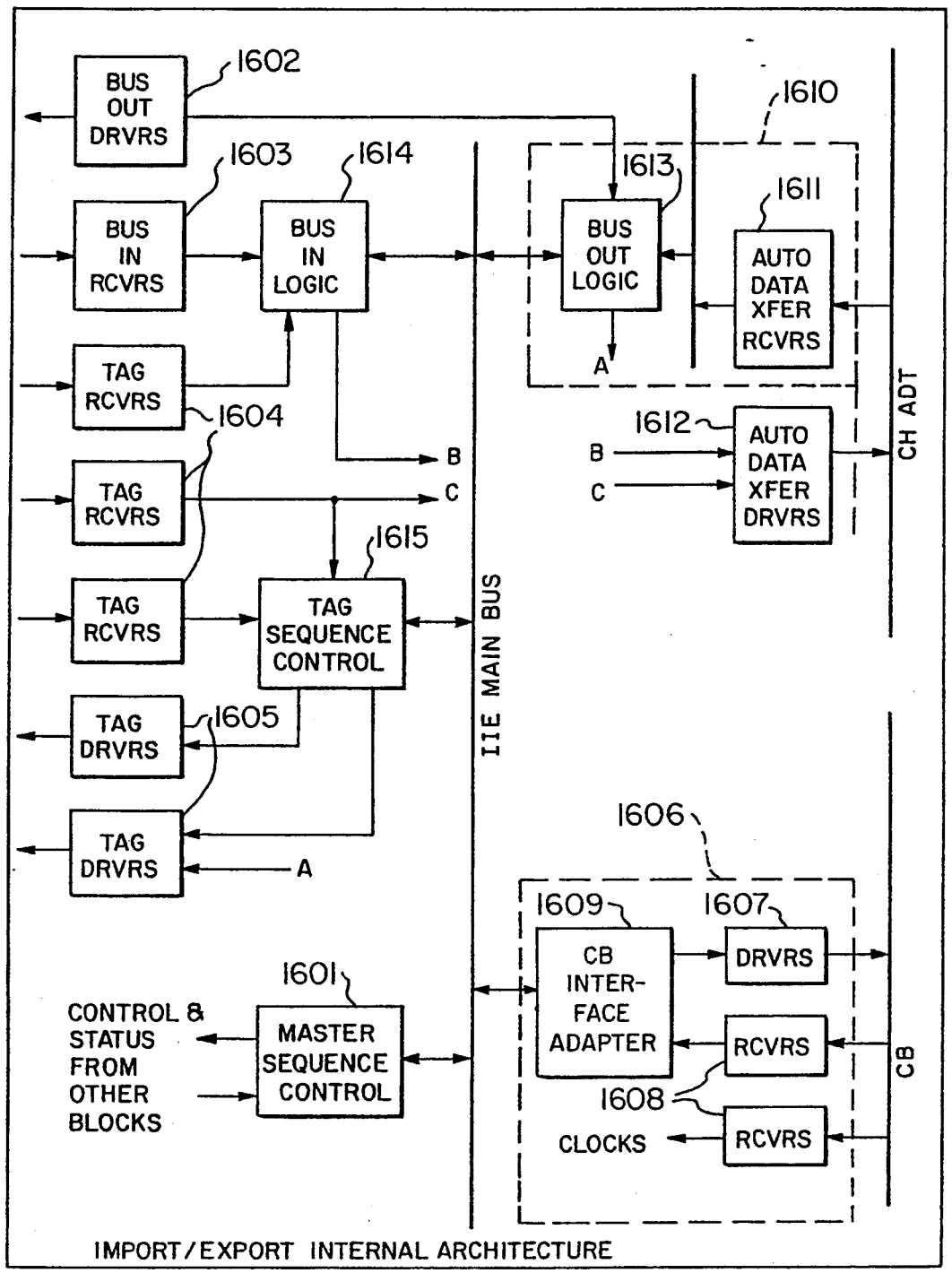
FIG. 16 illustrates additional details of an import/export control unit interface.

FIG. 16 illustrates in block diagram form additional details of the tape drive control unit interface 208-1 which is connected via data channel 20 to tape drive control unit 10 which interconnects the data channel 20 with a plurality of tape drives. Tape drive control unit interface 208 is similar in structure to a data channel interface circuit 201 and functions like a host channel interface so that the tape drive control unit 10 believes that data channel 20 is a normal IBM OEMI type channel. FIG. 16 illustrates the master sequence control 1601 which is the main functional control of the tape drive control unit interface circuit 208. All other control function in the tape drive control unit interface circuit 208 are slaves to the master sequence control circuit

1601. Master sequence control 1601 recognizes and responds to sequences of events that occur on the data channel 20 for those initiated by elements within control cluster 111. Master sequence control 1601 contains a microsequencer, instruction memory, bus source and destination decode registers and various other registers as are well known in the art. A plurality of bus input receivers 1603 and bus output drivers 1602 and tag receivers 1604 and drivers 1605 are provided to transmit tag or bus signals to the tape drive control unit 10. These transmitters and receivers conform to the requirements set in the IBM OEMI specification so that normal IBM channels can be used to connect data storage subsystem 100 with a conventional tape drive control unit 10. The details of these drivers and receivers are well known in the art and are not disclosed in any detail herein. Control signals and data from processor 204 in cluster control 111 are received in the tape drive control unit interface 208-1 through the control bus interface 1606 which includes a plurality of drivers and receivers 1607, 1608 and an interface adapter 1609 which contains FIFOs to buffer the data transmitted between the main bus of the tape drive control unit interface circuit 208-1 and data and control busses 206-D, 206-C, respectively. Furthermore, automatic data transfer interface 1610 is used to transfer data between the tape interface drivers and receivers 1602, 1603 and cache memory 113 on bus CH ADT via receivers and transmitters 1611, 1612. Thus, the function of tape drive control unit interface circuit 208-1 is similar to that of channel interface circuits 201 and serve to interconnect a standard tape drive control 10 via data channel 20 to data storage subsystem 100 to exchange data and control information therebetween.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous Count Key Data disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (ex 122-1 to 122-n+m), each containing N+M disk drives to store N physical tracks of data and M physical tracks of redundancy information for each logical track. The physical layer functions as a plurality of individual small form factor disk drives, or other media. The data storage management system operates to effectuate the mapping of data among these abstract layers and to control the allocation and management of the actual space on the physical devices. These data storage management functions are performed in a manner that renders the operation of the disk drive array data storage subsystem 100 transparent to the data processors (2 - 2').

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. Disk drive array data storage subsystem 100 appears to the host processor to be a collection of large form factor disk drives, each of which contains a predetermined number of tracks of a predetermined size called a virtual track. Therefore, when the data processor 2 transmits data over the data channel 21 to the data storage subsystem 100, the data is transmitted in the form of the individual records of a virtual track. In order to render the operation of the disk drive array data storage subsystem 100 transparent to the data processor 2, the received data is stored on the actual physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the data processor 2, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the disk drive array data storage subsystem 100 in order to create entirely free logical cylinders. In order to evenly distribute data transfer activity, the tracks of each virtual device are scattered as uniformly as possible among the logical devices in the disk drive array data storage subsystem 100. In addition, virtual track instances are padded out if necessary to fit into an integral number of physical device sectors. This is to insure that each virtual track instance starts on a sector boundary of the physical device.

Virtual Track Directory

Figure 9:
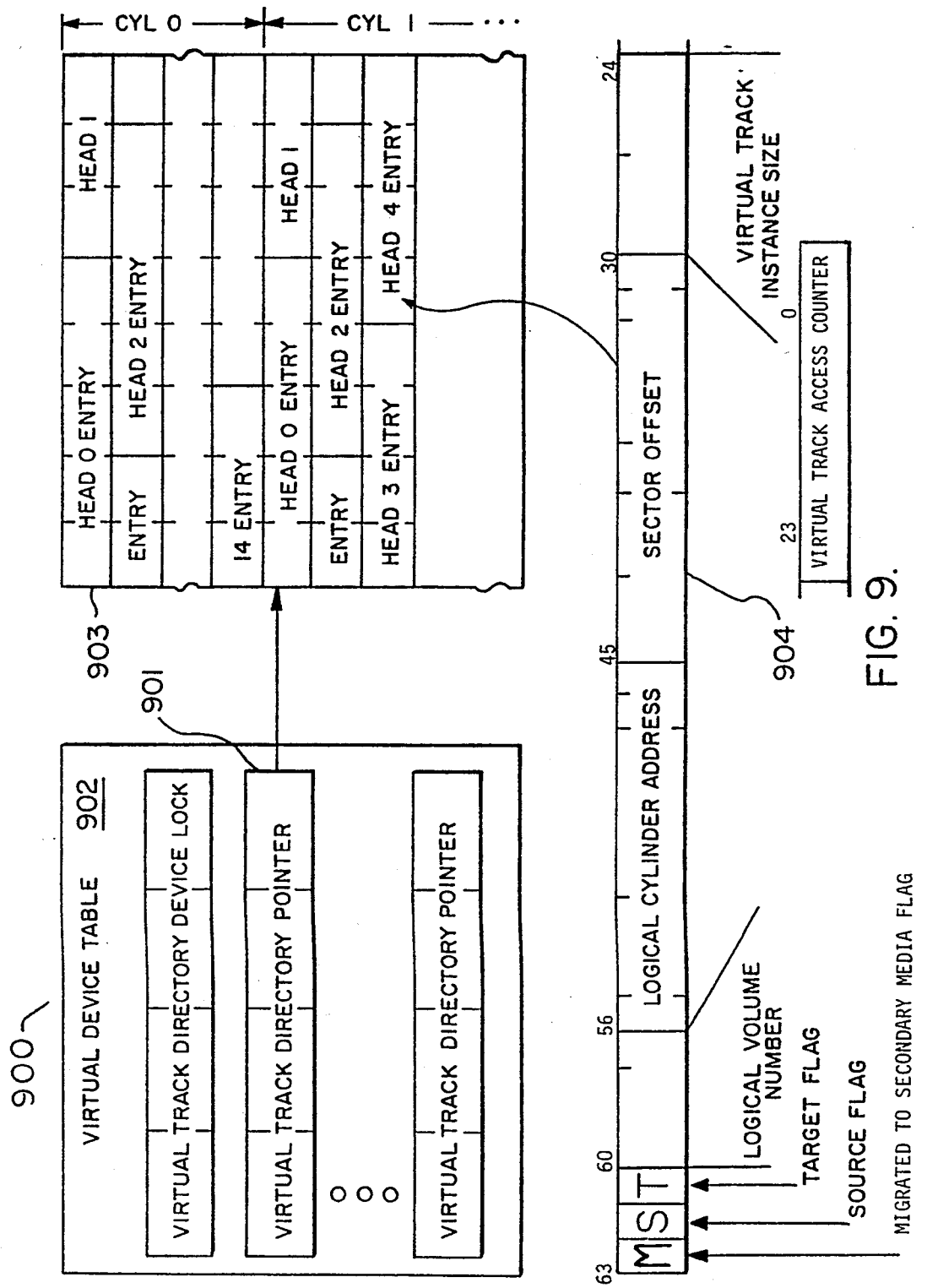
FIG. 9 illustrates the format of the virtual track directory.

FIG. 9 illustrates the format of the virtual track directory 900 that is contained within cache memory 113. The virtual track directory 900 consists of the tables that map the virtual addresses as presented by data processor 2 to the logical drive addresses that is used by control unit 101. There is another mapping that takes place within control unit 101 and this is the logical to physical mapping to translate the logical address defined by the virtual track directory 900 into the exact physical location of the particular disk drive or secondary media that contains data identified by the data processor 2. The virtual track directory 900 is made up of two parts: the virtual track directory pointers 901 in the virtual device table 902 and the virtual track directory 903 itself. The virtual track directory 903 is not contiguous in cache memory 113 but is scattered about the physical extent of cache memory 113 in predefined segments (ex 903-1). Each segment 903-1 has a virtual to logical mapping for a predetermined number of cylinders, for example 64 cylinders worth of IBM 3380 type DASD tracks. In the virtual device table 902, there are pointers to as many of these segments 903 as needed to emulate the number of cylinders configured for each of the virtual devices defined by data processor 2. The virtual track directory 900 is created by control unit 101 at the virtual device configuration time. When a virtual volume is configured, the number of cylinders in that volume is defined by the data processor 2. A segment 903-1 or a plurality of segments of volatile cache memory 113 are allocated to this virtual volume defined by data processor 2 and the virtual device table 902 is updated with the pointers to identify these segments 903 contained within cache memory 113. Each segment 903 is initialized with no pointers to indicate that the virtual tracks contained on this virtual volume have not yet been written. Each entry 905 in the virtual device table is for a single virtual track and is addressed by the virtual track address. As shown in FIG. 9, each entry 905 is 64 bits long. The entry 905 contents are as follows starting with the high order bits:

Bits 63: Migrated to Secondary Media Flag.

Bit 62: Source Flag.

Bit 61: Target Flag.

Bits 60-57: Logical volume number. This entry corresponds to the logical volume table described above.

Bits 56-46: Logical cylinder address. This data entry is identical to the physical cylinder number.

Bits 45-31: Sector offset. This entry is the offset to the start of the virtual track instance in the logical cylinder, not including the parity track sectors. These sectors are typically contained 512 bytes.

Bits 30-24: Virtual track instance size. This entry notes the number of sectors that are required to store this virtual track instance.

Bits 23-0: Virtual Track Access Counter. This entry contains a running count of the number of times the Virtual Track has been staged.

If the Migrated to Secondary Media Flag is clear, the rest of the entry contains the fields described above. If the Migrated to Secondary Media Flag is set, the Logical Cylinder containing the Virtual Track has been migrated to the Secondary Media and the rest of the entry contains a pointer to a Secondary Media Directory.

Secondary Media Directory

The Secondary Media Directory contains pointers to all the data that has been migrated and is no longer resident on the DASD contained in the subsystem, The Secondary Media Directory also contains a Retrieving flag for each Logical Cylinder indicating that the data is in the process of being retrieved, The Secondary Media Directory is kept in cache and is backed up along with the Virtual Track Directory to allow recovery in the event of a cache failure.

Logical Cylinder Directory

FIG. 12 illustrates the format of the Logical Cylinder Directory, Each Logical Cylinder that is written contains in its last few sectors a Logical Cylinder Directory (LCD). The LCD is an index to the data in the Logical Cylinder and is used primarily by Free Space Collection to determine which Virtual Tracks Instances in the Logical Cylinder are valid and need to be collected. FIG. 12 shows the LCD in graphic form, The Logical Cylinder Sequence Number uniquely identifies the Logical Cylinder and the sequence in which the Logical Cylinders were created. It is used primarily during Mapping Table Recovery operations. The Logical Address is used as a confirmation of the Cylinders location for data integrity considerations. The LCD Entry count is the number of Virtual Track Instances contained in the Logical Cylinder and is used when scanning the LCD Entries, The Logical Cylinder Collection History contains when the cylinder was created, whether it was created from Updated Virtual Track Instances or was created from data collected from another cylinder, and if it was created from collected data, what was the nature of the collected data. The LCD Entry itself contains the identifier of the virtual track and the identifier of the relative sector within the logical cylinder in which the virtual track instance begins.

Free Space Directory

The storage control also includes a free space directory (FIG. 8) which is a list of all of the logical cylinders in the disk drive array data storage subsystem 100 ordered by logical device. Each logical device is cataloged in two lists called the free space list and the free cylinder list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. In addition to the pointers and free sector count, the Free Space Directory also contains entries that do not relate to Free Space, but relate to the Logical Cylinder. There is a flag byte known as the Logical Cylinder Table (LCT) which contains, among other flags, a Collected Flag and an Archive Flag. The Collected Flag is set when the logical cylinder contains data that was collected from another cylinder. The Archive Flag is set when the logical cylinder contains data that was collected from a logical cylinder which had its Collected Flag set. If either one of these flags is set, the Access Counter and the Last Access Date/Time is valid. The Creation Time/Date is valid for any cylinder that is not free.

The collection of free space is a background process that is implemented in the disk drive array data storage subsystem 100. The free space collection process makes use of the logical cylinder directory, which is a list contained in the last few sectors of each logical cylinder, indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Mapping Tables

It is necessary to accurately record the location of all data within the disk drive array data storage subsystem 100 since the data received from the data processors 2 - 2' is mapped from its address in the virtual space to a physical location in the subsystem in a dynamic fashion. A virtual track directory is maintained to recall the location of the present instance of each virtual track in disk drive array data storage subsystem 100. Changes to the virtual track directory are journaled to a non-volatile store and are backed up with fuzzy image copies to safeguard the mapping data. The virtual track directory 3 consists of an entry 300 (FIG. 9) for each virtual track which the associated data processor 2 can address. The virtual track directory entry 300 also contains data 307 indicative of the length of the virtual track instance in sectors. The virtual track directory 3 is stored in noncontiguous pieces of the cache memory 113 and is addressed indirectly through pointers in a virtual device table. The virtual track directory 3 is updated whenever a new virtual track instance is written to the disk drives.

The storage control also includes a free space directory 800 (FIG. 8) which is a list of all of the logical cylinders in the disk drive array data storage subsystem 100 ordered by logical device. Each logical device is cataloged in a list called a free space list 801 for the logical device; each list entry represents a logical cylinder and indicates the amount of free space that this logical cylinder presently contains. This free space directory contains a positional entry for each logical cylinder; each entry includes both forward 802 and backward 803 pointers for the doubly linked free space list 801 for its logical device and the number of free sectors contained in the logical cylinder. Each of these pointers 802, 803 points either to another entry in the free space list 801 for its logical device or is null. The collection of free space is a background process that is implemented in the disk drive array data storage subsystem 100. The free space collection process makes use of the logical cylinder directory, which is a list contained in the last few sectors of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Move/Copy Operation

The data record move/copy operation instantaneously relocates or creates a second instance of a selected data record by merely generating a new pointer to reference the same physical memory location as the original reference pointer in the virtual track directory. In this fashion, by simply generating a new pointer referencing the same physical memory space, the data record can be moved/copied.

This apparatus instantaneously moves the original data record without the time penalty of having to download the data record to the cache memory 113 and write the data record to a new physical memory location. For the purpose of enabling a program to simply access the data record at a different virtual address, the use of this mechanism provides a significant time advantage. A physical copy of the original data record can later be written as a background process to a second memory location, if so desired. Alternatively, when one of the programs that can access the data record writes data to or modifies the data record in any way, the modified copy of a portion of the original data record is written to a new physical memory location and the corresponding address pointers are changed to reflect the new location of this rewritten portion of the data record.

In this fashion, a data record can be instantaneously moved/copied by simply creating a new memory pointer and the actual physical copying of the data record can take place either as a background process or incrementally as necessary when each virtual track of the data record is modified by one of the programs that accesses the data record. This data record copy operation can be implemented in a number of different ways. A first method of manipulating memory pointers is to use a lookaside copy table which functions as a map to be used by the data storage subsystem 100 to list all the data records that are accessible by more than one virtual address. A second method of manipulating data record pointers is to provide additional data in the virtual track directory 3 in order to record the copy status of each data record therein. These two methods each have advantages and disadvantages in the implementation of the data record pointer management function and are disclosed herein as implementations illustrative of the concept of this invention.

Copy Table Implementation

Each entry 300 in the Virtual Track Directory (VTD) 3 contains two flags associated with the Copy/Move function. The "Source" flag 306 is set whenever a Virtual Track Instance at this Virtual Track Address has been the origin of a copy or move. The Virtual Track Instance pointed to by this entry 300 is not necessarily the Source, but the Virtual Track Instance contains this Virtual Address. If the Source flag 306 is set, there is at least one entry in the Copy Table 400 (FIG. 4) for this Virtual Address. The "Target" flag 303 is set whenever a Virtual Track Instance contains data that has been the destination of a copy or move. If the Target flag 303 is set, the Virtual Address in the Virtual Track Instance that is pointed to is not that of the Virtual Track Directory Entry 300.

Figure 4:
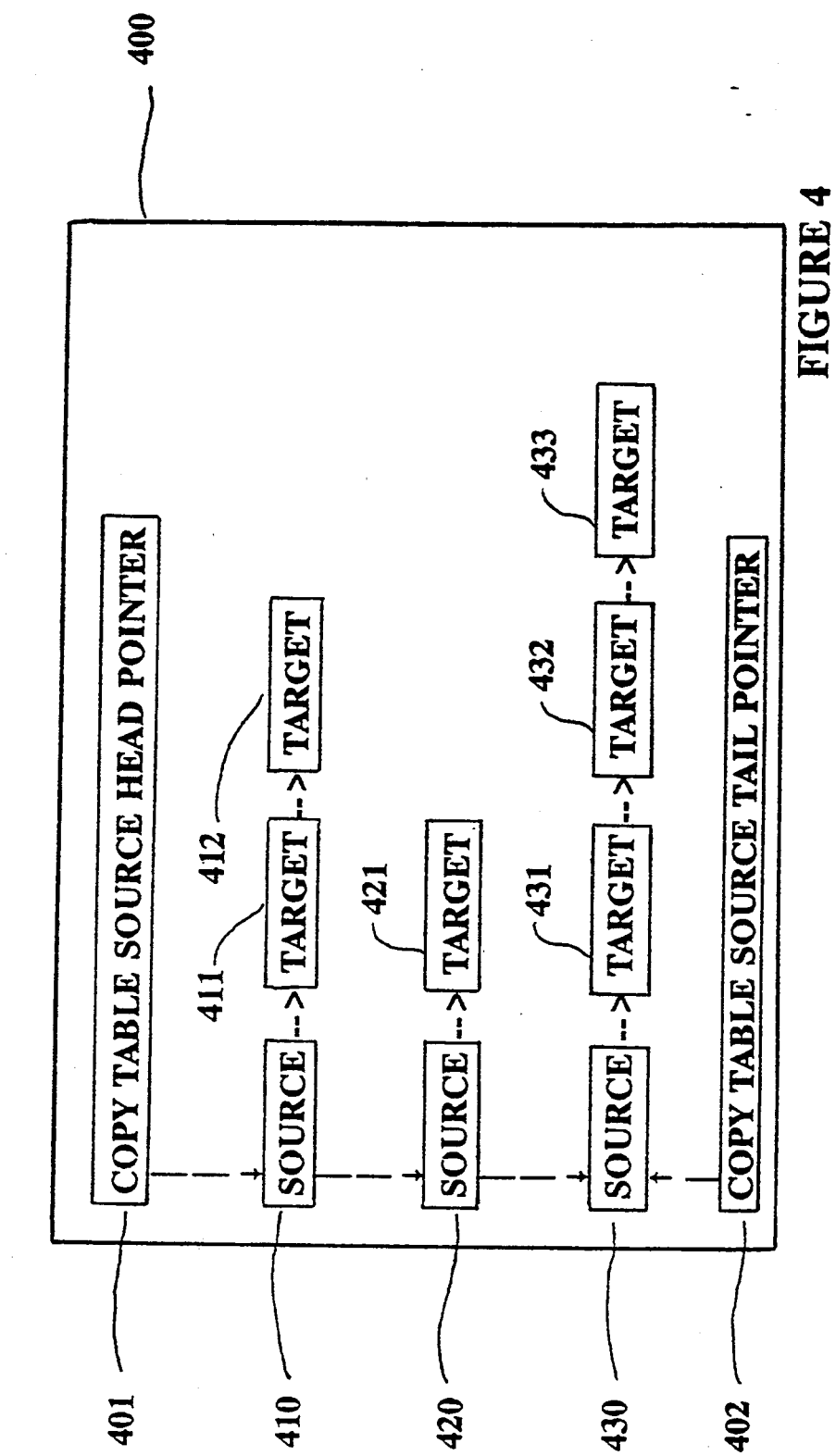
FIG. 4 illustrates the format of a copy table.

The format of the Copy Table 400 is illustrated graphically in FIG. 4. The preferred implementation is to have a separate lookaside Copy Table 400 for each Logical Device so that there is a Copy Table head 401 and tail 402 pointer associated with each Logical Device; however, the copy table 400 could just as easily be implemented as a single table for the entire data storage subsystem 100. In either case, the changes to the copy table 400 are journaled as noted above for the virtual track directory. The copy table is ordered such that the sources **4\*0 are in ascending Logical Address order. The copy table 400 is a singly linked list of Sources 4\*0 where each Source (such as 410) is the head of a linked list of Targets 411,412. The Source Entry 410** contains the following data:

---

Logical Address (VTD Entry Copy)
Virtual Address
Next Source Pointer (NULL if last Source in list)
Target Pointer
The Target Entry 411 contains the following data:
Virtual Address
Next Target Pointer (NULL if last Target in list)

Snapshot Copy Operation Using Copy Table

Figure 5:
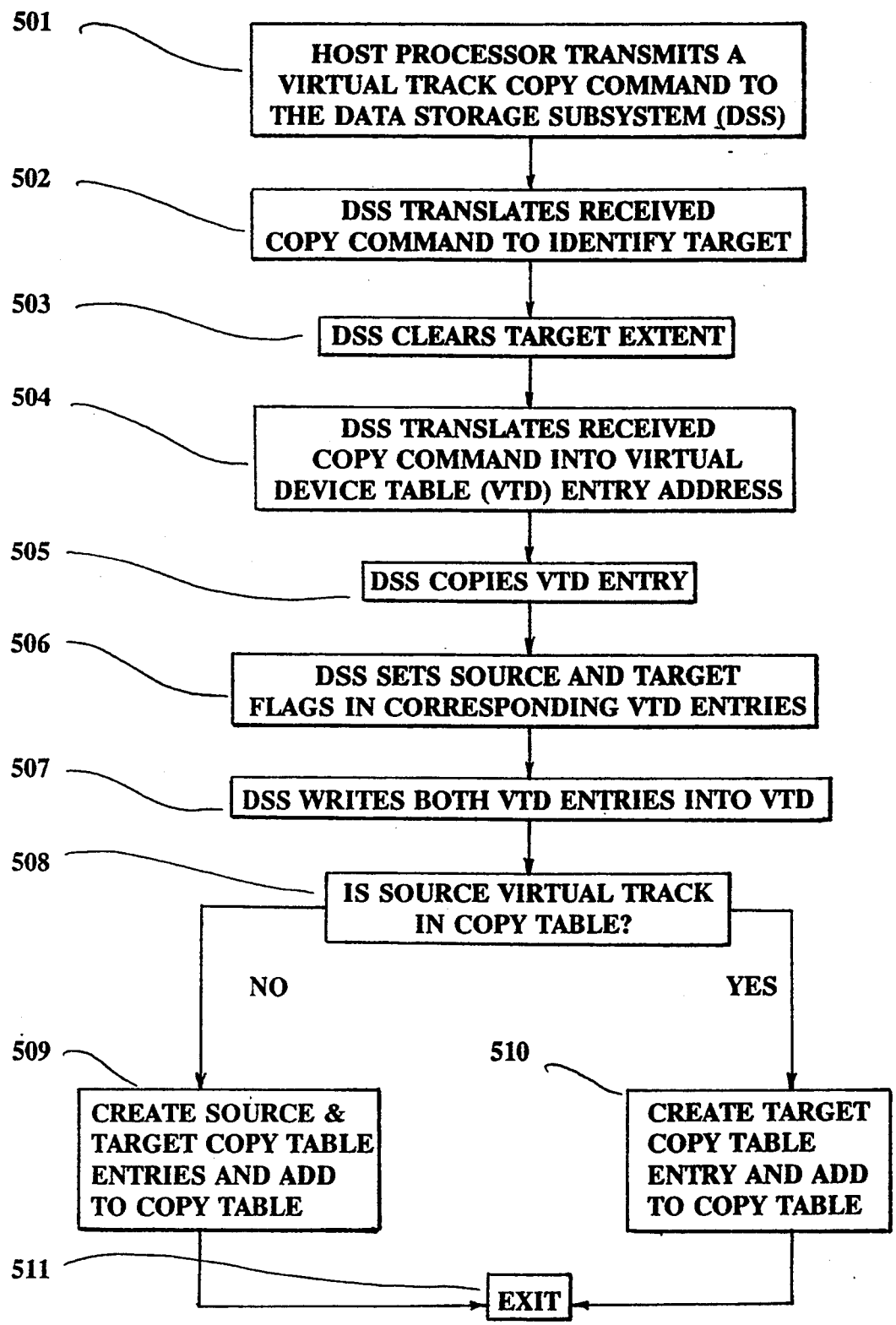
FIG. 5 illustrates in flow diagram form copy table implementation of a data record copy operation.

FIG. 5 illustrates in flow diagram form the operational steps taken by data storage subsystem 100 to produce a copy of a virtual track instance (also referred to as data record) using the copy table implementation of the snapshot copy operation. When data processor 2 transmits a data copy request to data storage subsystem 100 over data link 21 at step 501, the control software in processor 204-0 for example translates the received data copy request into an identification of a particular virtual track directory entry 300 stored in cache memory 113 at step 502. Processor 204-0 in data storage subsystem 100 verifies at step 503 that the extents are defined, the same length and do not overlap. The cache management software ensures at step 504 that all the tracks in this target extent are cleared and available for the copy operation. Processor 204-0 reads the virtual track directory entry 300 and creates at step 505 a copy of this entry to be used as the virtual track directory entry for the target virtual track. At step 506 processor 204-0 sets the source 306 and target 303 flags respectively in the original and copied virtual track directory entries. Processor 204-0 then writes at step 507 the updated virtual track directory entry for the source virtual track back into the virtual track directory 3 as well as the new virtual track directory entry for the target virtual track into the virtual track directory 3. At step 508, a determination is made whether the source virtual track is already listed in copy table 400. If the source virtual track is not already a source or a target virtual track in copy table 400, then both the source entry and a target entry are created by processor 204-0 and written at step 509 into copy table 400 in the form noted above with respect to FIG. 4. If the source data record was already marked as a source or a target data record in copy table 400, then copy table 400 is scanned at step 510 in order to locate this entry and the target entry is added to this linked list to create a new target for this source data record. A more specific recitation of this process is illustrated in the following pseudo code:

```
Read VTD Entry for Source
Set Source Flag in VTD Entry
Write updated VTD Entry for Source back to VTD
Set Target Flag in a copy of the VTD Entry
Read VTD entry for Target
Increase Free Space for Cylinder pointed to by
  old VTD entry
Reorder Free List, if necessary
Write updated VTD Entry to Target location in
  VTD
Create Target Entry for the Copy Table
  Move the Update Count Fields Flag from the
    command to the Target Entry
If Source is NOT already a Source or a Target
  Create Source Entry for Copy Table
  Link Source into proper location in Copy
    Table
  Link Target Entry to Source Entry in Copy
    Table
Elseif (New Source was already marked as
  Source)
    Scan Source List to find Source in Copy
      Table
    If find Source
      Link Target to Last Target in this
        Source's Target List
    Else (scanned to end of Source List)
      Create Source Entry for Copy Table
      Link Source into proper location in
        source list
      Link Target Entry to Source Entry in
        Copy Table
  Endif
Else (New Source was already in Copy Table as
  Target)
    Scan Source List to find Logical Address of
      Target
    Link Target Entry to Last Target in this
      Source's Target List
Endif
Journal the changes to the VTD and to the Copy
  Table
```

Moving a data record without a copy operation is functionally similar to the snapshot copy operation described above. A significant difference is that the virtual track directory entry 300 contains a NULL pointer in the virtual track address 320 to indicate that this virtual address does not contain any data and the source flag bit 306 is set to indicate that this virtual address is still a source. The following pseudo code listing indicates an instant move operation for a target data record, to highlight the difference between this operation and the above noted data record copy operation:

```
Read VTD Entry for New Target
Increase Free Space for Cylinder pointed to by
  old VTD Entry
Reorder Free List if necessary
Read VTD Entry for the Source
Set Source Flag in VTD Entry
Write a NULL pointer into the Logical Address
  Pointer of the VTD Entry
Write Updated VTD for Source back to VTD
Write an unmodified copy of the old VTD Entry
  to Target location in VTD
(This entry already has the Target Flag set)
Scan Source List for the Logical Address in the
  VTD Entry for the Target
Scan Target List to find this Target in Target
  List
Update the Target Entry to the address the data
  was moved to
  Move the Update Count Fields Flag from the
    command to the Target Entry
Journal the changes to the VTD and to the Copy
  Table
```

Virtual Track Directory Copy Implementation

This second method of managing the data pointers makes use of an expanded virtual track directory 3 which increases each entry 300 to allow room for a virtual track address 320 that consists of copy virtual device number 308, copy virtual cylinder number 309 and copy virtual head number 310 elements which act as a pointer to another virtual track that was copied from the first virtual track. The virtual track directory entry for the track pointed to from the first virtual track directory entry contains the same logical address as the first and contains the virtual track address of the next virtual track directory entry in the chain of target data records. Thus, multiple tracks copied from a single source track are identified by a singly linked list that loops back to itself at the source track to form a synonym ring of pointers. Thus, the virtual track directory itself contains an embedded copy table instead of using the lookaside copy table described above. Theoretically, any number of copies of a single track can be made using this method since the virtual track directory entries are simply linked together in ring form. As a management construct, the number of copies can be limited to a predetermined number and, if a user requests further copies to be made, a second set of copies can be created by staging the data record from the backend data storage devices to make a second physical copy in cache memory 113 which can be used as the basis of a second ring in order to enable the length of each ring to be maintained at a reasonable manageable number.

Figure 17:
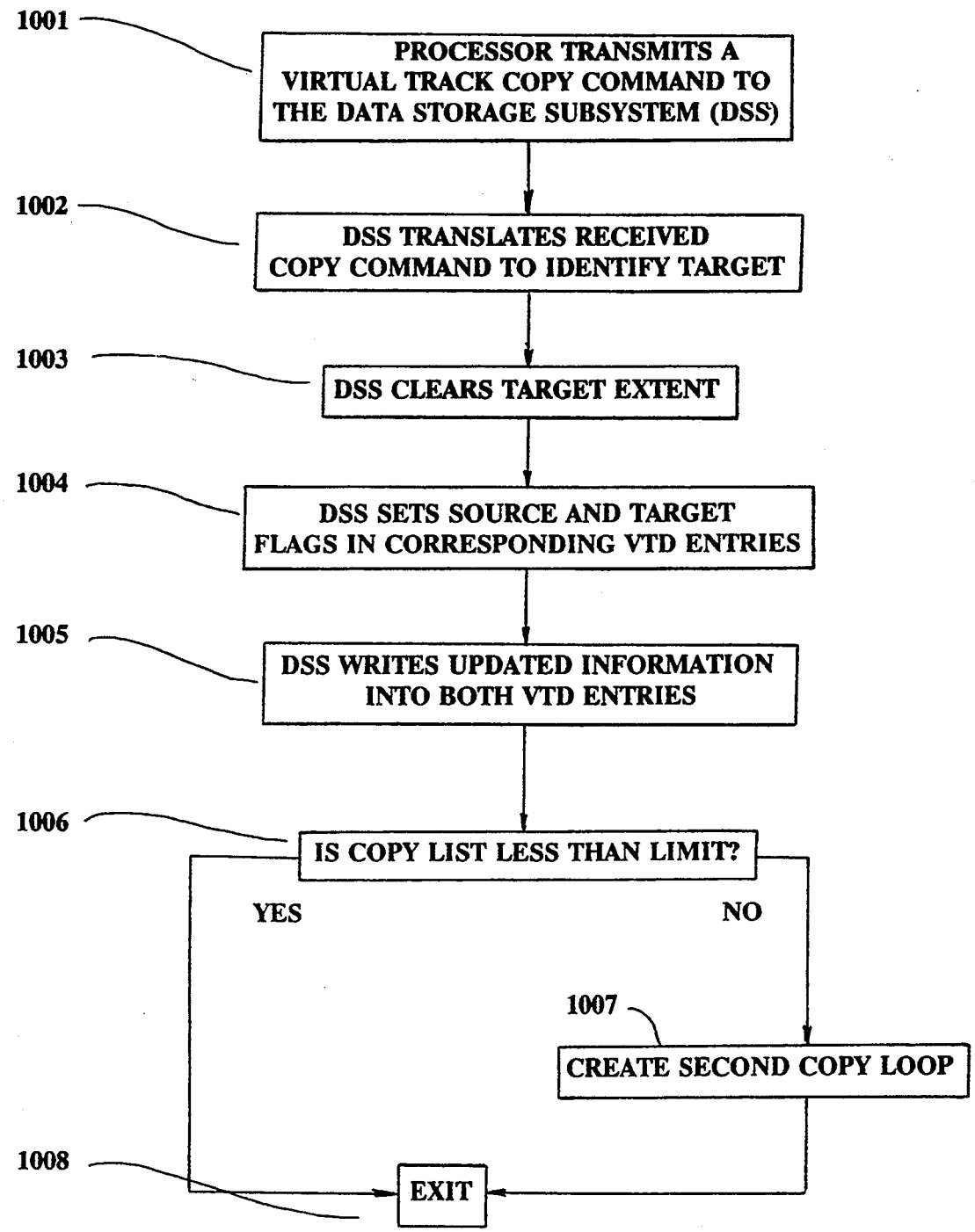
FIG. 17 illustrates in flow diagram form the virtual track directory implementation of a data record copy operation.

The operation of the virtual track directory implementation is illustrated in flow diagram form in FIG. 17. At step 1001, the data storage subsystem receives a copy request from data processor 2 over data channel 21. Processor 204-0 in data storage subsystem 100 verifies at step 1002 that the extents are defined, the same length and do not overlap. The cache management software ensures at step 1003 that all the tracks in this target extent are cleared and available for the copy operation. This is explained in further detail in the following pseudo code:

```
For each track in source extent, search cache
    IF track is found
       Mark track as 'Copy Loop Track'
       IF track is modified
          CALL Copy Modified Track service routine
          PASS Source Virtual Track Address
          PASS Target Virtual Track Address
           Function forms Copy Loop in VTD and
           marks target as 'No Backend Address'
           IF Copy Loop is below Max Size
              RETURN (SUCCESS) ;* No Action
              Necessary
           ELSE (Loop too big - Need to Break
            Mark Target as Pseudosource in VTD
            Entry
            RETURN (Cache Copy to Target
            Address and Destage Target)
           ENDIF
           RECEIVE Status
           Cache must do the following:
           IF status is Cache Copy to Target and
           Destage Target
              Do Not search for track - target
              can't be in cache
              Do a Cache to Cache Copy of the
              source
              Load the copy with the target
              address
              Schedule the Destage of the track
           ENDIF
         ENDIF
      ENDIF
ENDFOR
```

Once this operation is completed, the source and target virtual track directory entries are updated at step 1004 to indicate their status as source and target, respectively and the virtual track address information contained therein is modified at step 1005 to indicate that both of these virtual track directory entries are part of a copy loop.

In order to limit the length of the singly linked list of source and target tracks in the copy operation, the length of the copy list is checked at step 1006 and if less than a predetermined limit, the task is completed. If the copy list exceeds this predetermined limit, then at step 1007 a second copy loop is created as described in the following copy count management code:

```
IF the loop is bigger than limit
   Set 'Hold Off VCKD Response' flag
   Increment Copy Notify Count in Copy Command in
   Virtual Device Table
   IF any target is marked as Modified or as a
   pseudosource
      Mark Pseudosource as 'Notify when Destaged'
      Destage Task will tell Copy Task when the
      destage is complete and the Loop Size is
      reduced
      CALL Destage Track Cache function
      PASS Virtual Track Address
      PASS No Response Indicator
   ELSE (No tracks are modified)
      Mark Target as Pseudosource in VTD Entry
      (Set Source and Target)
      Mark Target (Pseudosource) as 'Notify when
      Destaged'
      CALL Stage and Destage Track cache service
      routine
      PASS Target Address
      Cache SW must hash to the passed address.
      IF the track is in cache
         Schedule the Destage of the track
      ELSE (Track is not in cache)
         Schedule the Stage of the track
         Once track is in cache, immediately
         schedule the Destage of the track
      ENDIF
      When track is destaged, Destage Task
      breaks Copy Loop
      into two Copy Loops with pseudosource as
      new source,
      and returns response to Copy Task.
   ENDIF
ENDIF
```

Staging and Destaging of Copy Loop Tracks

When a track is to be updated in cache memory 113, it must be determined whether this track is part of a copy loop. It is important to do this to ensure that the integrity of the multiple copies of this track are maintained and that only the appropriate copies of this track are modified according to the following procedure:

```
IF the track is not a Copy Loop
   RETURN (SUCCESS)
   No action required by cache SW
ELSEIF (the track is a Target)
   IF the track marked as a Pseudosource in VTD
      RETURN (Do Not Update - Track Being
      Scheduled for Destage)
   ELSE
      Mark track as 'Modified In Cache' in VTD
      Entry
      RETURN (SUCCESS)
      No action required by cache SW
   ENDIF
ELSE (the track is a Source)
   Scan Copy Loop to find an unmodified target
   IF unmodified target found
      Could be marked 'No Backend Address'
      Mark Target as Pseudosource in VTD Entry
      (Set Source and Target)
      RETURN (Cache Copy to Returned Address and
      Destage Returned Track)
      Cache SW must hash to the returned
      address.
      IF the track is in cache
         Schedule the Destage of the track
      ELSE (Track is not in cache)
         DO a Cache to Cache Copy of the source
         Load the copy with the returned
         address (Pseudosource address)
         Schedule the Destage of the track
      ENDIF
      Go ahead with modifications to the source
   ELSE (unmodified target not found)
```

```
        RETURN (Target List with an indicator to
    Destage Targets)
        Cache SW must hash to the passed
        addresses and
        schedule the Destage of all those tracks.
        Destage will not allow the source track
        to be
        destaged until all the targets are
        destaged first.
        The Cache SW can go ahead with
        modifications to the source
    ENDIF
ENDIF
```

As can be seen from this pseudo code, a cache to cache copy of the track must be made if this track is a source in a copy loop in order to ensure that the noted copies of this track are maintained at their present status and not corrupted by the modification to the original track performed by cache memory 113. Similarly, the destaging of copy loop tracks are performed in a manner to maintain the integrity of the copy loop and ensure that the proper vintage of data is written to the appropriate physical location in the backend data storage for the designated virtual address.

Figure 18:
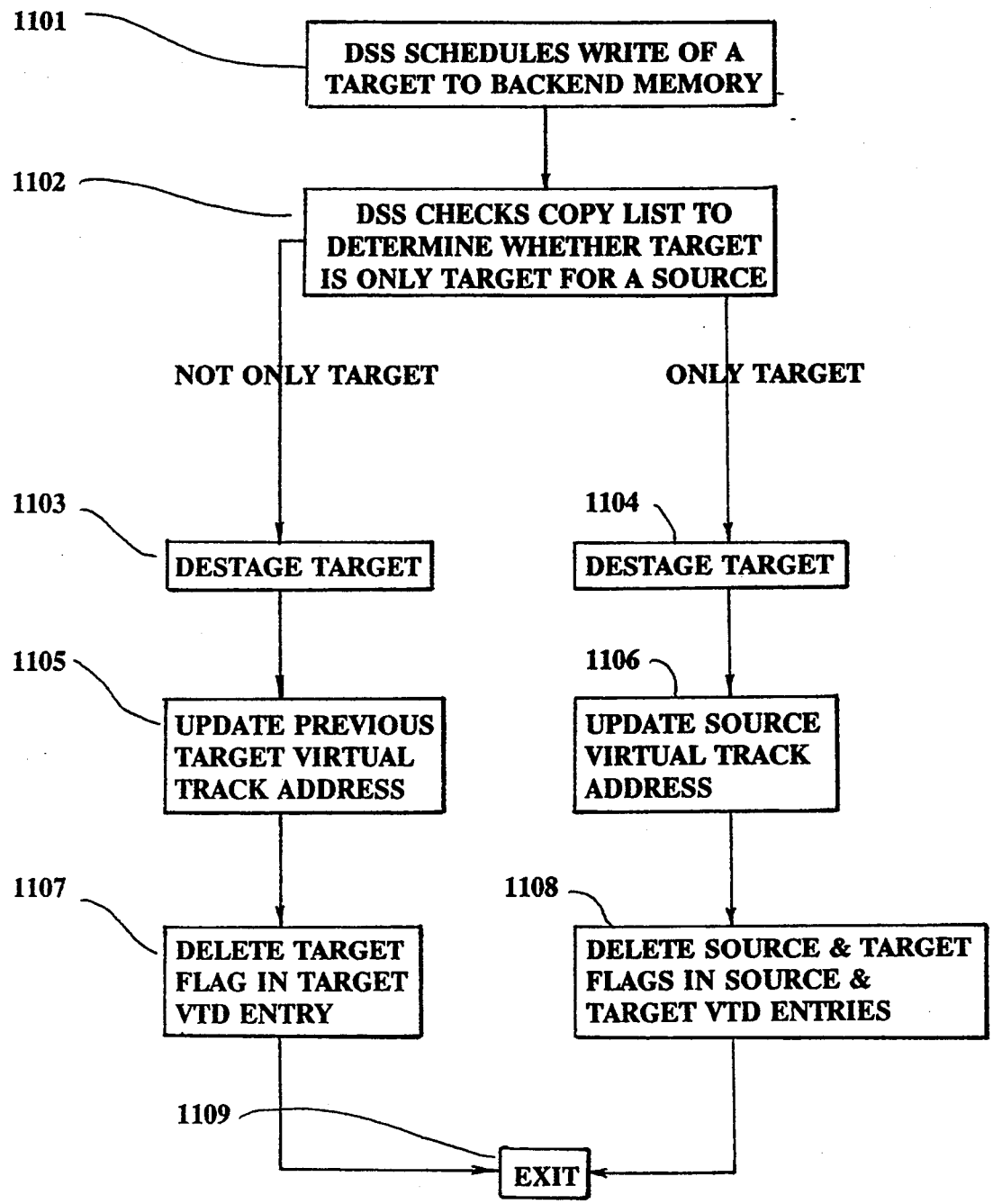
FIG. 18 illustrates in flow diagram form the steps taken to update the virtual track directory when a virtual track that was copied from another virtual track is written to the disk drives of a redundancy group.

FIG. 18 illustrates in flow diagram form the operational steps taken by processor 204-0 when at step 1101 it schedules the writing of a virtual track that is a target to the backend storage 103. At step 1102, a check is made of the copy list to determine whether the target is the only target for the associated source. If not, at step 1103, the target is destaged from cache memory 113 to backend storage 103 and the copy virtual track address 320 of the previous track in the copy list is updated to reflect the deletion of this target from the copy list. The target flag for the written target is reset at step 1107 to reflect the deletion of this target from the copy list. If this is the last target, at step 1104 it is destaged from cache memory 113 to backend storage 103. At step 1106, the source copy virtual track address 320 is deleted and the source and target flags are reset at step 1108 in the corresponding virtual track directory entries. The destaging algorithm for the copy list is described using the following pseudo code:

```
IF track is a source
    There must be at least one target for track
    to be a source
    IF all targets marked as 'No Backend Address'
        Write track to DASD
        Put Logical Address in Source and Targets in
          VTD
        Remove 'No Backend Address' indication
    ELSEIF (any Targets marked as 'Modified in
      Cache'
        AND Not marked 'Scheduled for Destage')
        Create TCB containing:
          Destage Failure Indicator
          Targets Not Destaged First Indicator
          Addresses of targets modified in cache and
            not scheduled for destage
        CALL Cleanup Track cache service routine
        PASS TCB Pointer
        The Targets may in fact have been
        scheduled for destage
        following the scheduling of the source.
        Cache SW must do following:
        FOR (All target addresses returned to
          cache)
            IF track not scheduled for destage
                CALL Destage Track Request
                    PASS Returned Target Address
            ENDIF
        ENDFOR
        CALL Destage Track Request
            PASS Source Address
    ELSE (any Targets marked as 'Modified in Cache'
        AND marked 'Scheduled for Destage')
        Put Request on Destage Blocked Queue marked
          as
            'Do Not Destage until Modified Target
            Destaged'
    ENDIF
ELSEIF (track is a pseudosource)
    Write track to DASD
    Update VTD to mark track as source
    Unlink previous source from Copy Loop
    Update Target Physical Addresses to new source
      location
    IF track marked as 'Notify when Destage'
        CALL Notify Copy Task function
            PASS Target Virtual Address
    ENDIF
ELSEIF (track is a target)
    Must be modified
    Update VTD to mark track as 'Scheduled for
      Destage'
    Write track to DASD
    IF track marked as 'Notify when Destage'
        CALL Notify Copy Task function
            PASS Target Virtual Address
    ENDIF
    IF (this is the last modified target in the
      Copy Loop
      AND source is in Destage Blocked Queue marked
        as
            'Do Not Destage until Modified Target
            Destaged')
        Move source request to Destage Request Queue
        Write source track to DASD
    ENDIF
ENDIF
```

As can be seen from these routines, care must be taken to not intermingle various versions of the virtual track instances as the copy loop is created, expanded and contracted by the movement of data into and out of cache memory 113 and the appropriate backend storage. A corresponding destaging process is executed for a copy table implementation of the pointer management.

Data Read Operation

Figure 6:
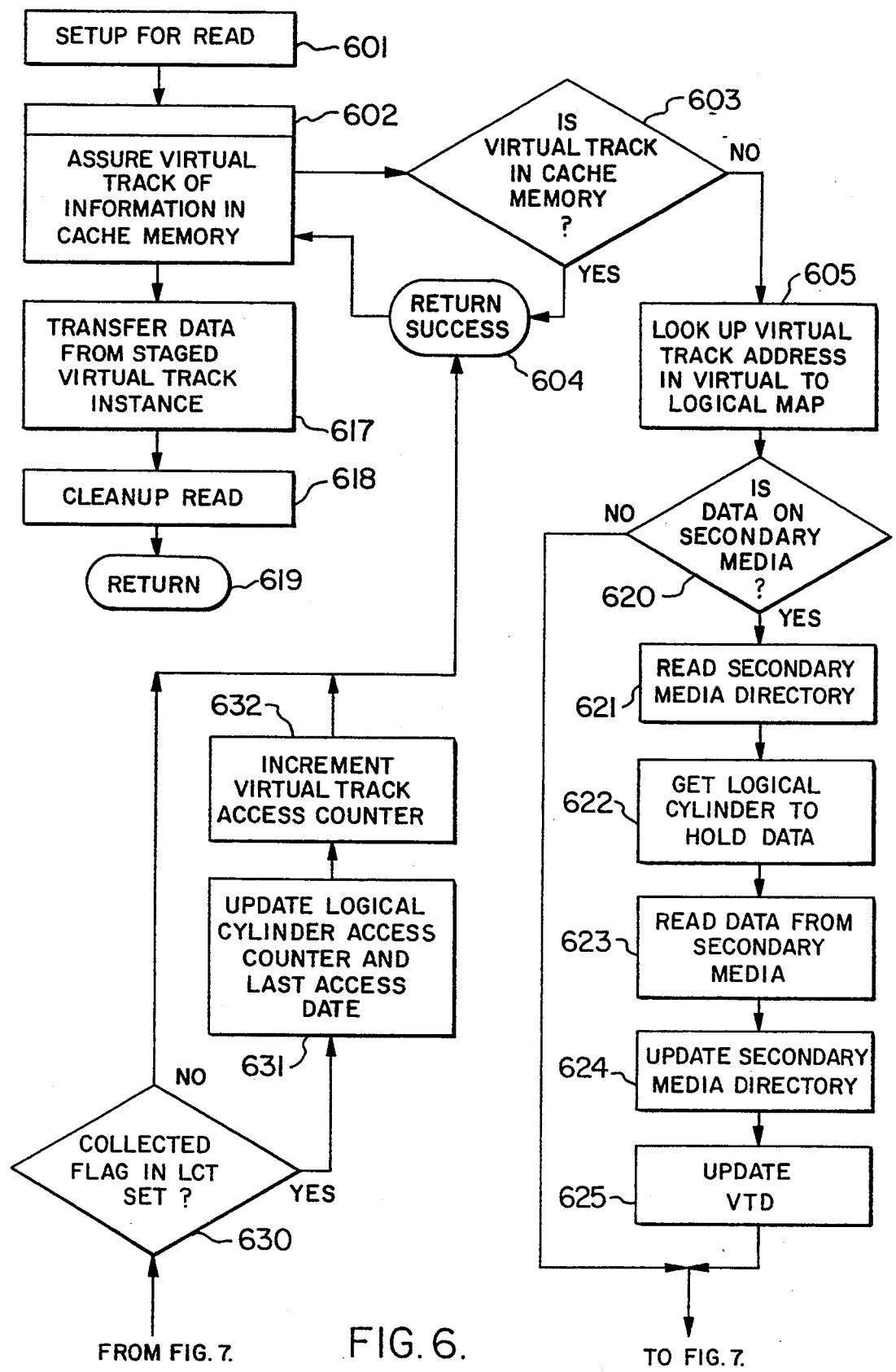
FIGS. 6 and 7 illustrate, in flow diagram form, the operational steps taken to perform a data read operation.
Figure 7:
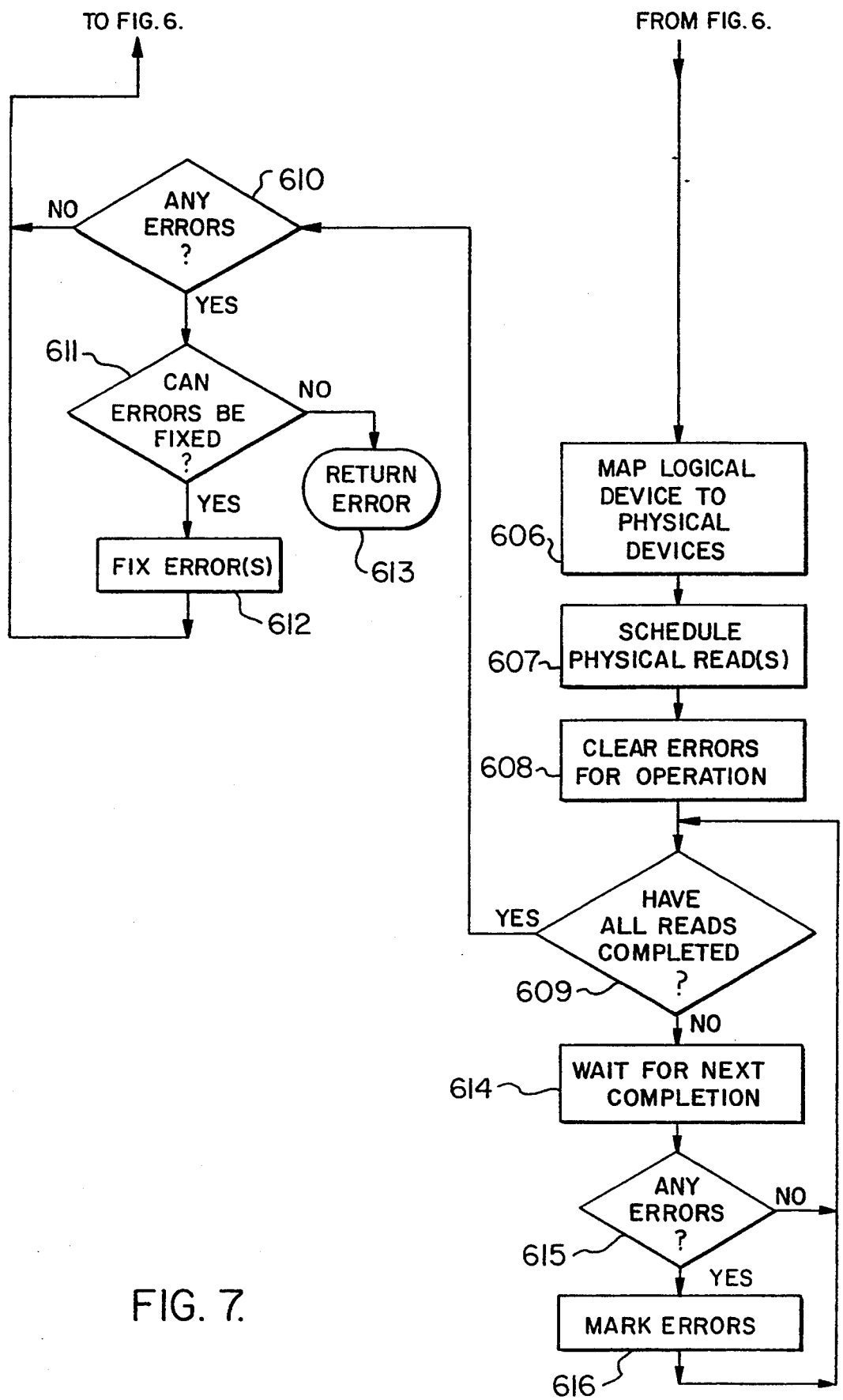

FIGS. 6 and 7 illustrate in flow diagram form the operational steps taken by processor 204 in control unit 101 of the data storage subsystem 100 to read data from a data redundancy group 122-1 to 122-n+m in the disk drive subsets 103. The disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605-616 is terminated.

Assume, for the purpose of this description, that the virtual track that has been requested is not located in the cache memory 113. Processing proceeds to step 605 where the control unit 101 looks up the address of the virtual track in the virtual to logical map table. At step 620, control unit 101 determines whether the requested virtual track resides on secondary media by reviewing the contents of the virtual track directory as described above. If the requested virtual track is not on secondary media, processing advances to step 606 as described below.

Retrieve Logical Cylinder From Secondary Media

If the requested virtual track is archived on secondary media, control unit 101 branches to step 621 where it reads the secondary media directory, located in cache memory 113 to obtain the pointer indicative of the physical location of the requested virtual track, for example on magnetic tape 10A. At step 622, control unit 101 obtains an unused logical cylinder in disk drive array 100 to store the logical cylinder containing the requested virtual track, that is to be retrieved from the secondary media. At step 623, control unit 101 sets the Retrieving flag in the secondary media directory to indicate that the logical cylinder is in the process of being transferred from the secondary media. Control unit 101 reads the logical cylinder containing the requested virtual track from its location in the secondary media to the reserved logical cylinder. Once the requested logical track has been transferred to the reserved logical cylinder, at steps 624 and 625, control unit updates the status of this logical cylinder in the secondary media directory and virtual track directory, respectively.

Logical Track Staging

The control unit 101 allocates space in cache memory 113 for the data and relocates the logical address to the cache directory. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-n+m. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing proceeds to step 630 where a test of the Collected Flag in the Logical Cylinder Table (LCT) is made. If the Collected Flag is clear, steps 631 and 632 are skipped and processing proceeds to step 604. If the Collected Flag is set, processing proceeds to step 631 where the Logical Cylinder Access Counter is incremented and the Last Access Time/data is loaded with the current time and date. Processing then returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the data processor 2 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 13:
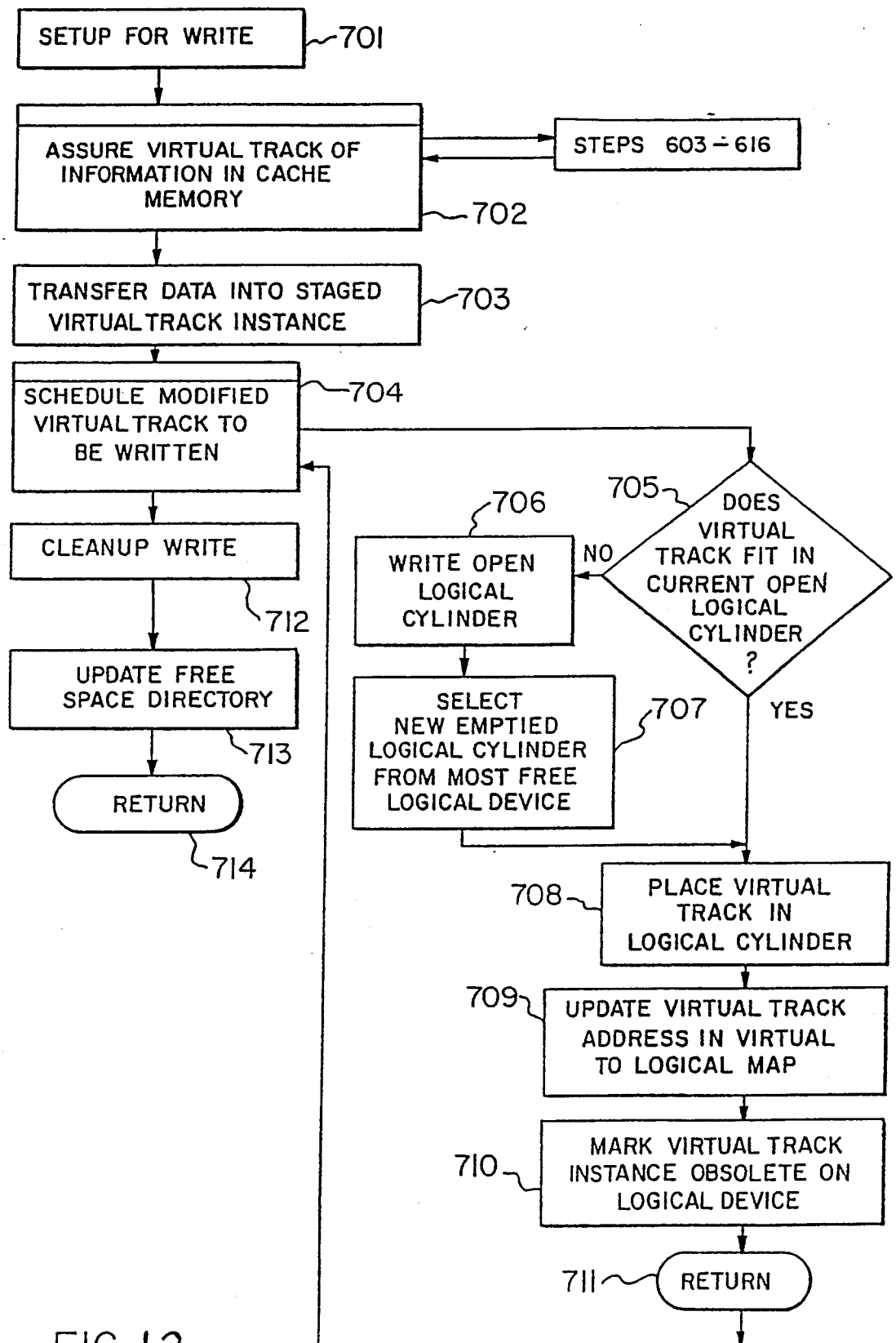
FIG. 13 illustrates, in flow diagram form, the operational steps taken to perform a data write operation.

FIG. 13 illustrates in flow diagram form the operational steps taken by the disk drive array data storage subsystem 100 to perform a data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. The modified data record is then transferred into the virtual track modified and this updated virtual track instance is then scheduled to be written from the cache memory 113 where the data record modification has taken place into the logical layer. Once the backend write operation is complete, the location of the obsolete instance of the virtual track is marked as free space. Any clean up of the write operation is then performed once this transfer and write is completed.

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603-616 illustrated in FIG. 6 above.

At step 703, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the disk drive array data storage subsystem 100.

This scheduling is accomplished by the subroutine that consists of steps 705-710. At step 705, the control unit 101 determines whether the virtual track instance as updated fits into an available open logical cylinder. If it does not fit into an available open logical cylinder, then at step 706 this presently open logical cylinder must be closed out and written to the physical layer and another logical cylinder selected from the most free logical device or redundancy group in the disk drive array data storage subsystem 100. At step 707, the selection of a free logical cylinder from the most free logical device takes place. This ensures that the data files received from data processor 2 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 708, the control unit 101 writes the updated virtual track instance into the logical cylinder and at step 709 the new location of the virtual track is placed in the virtual to logical map in order to render it available to the data processors 2 - 2'. At step 710, the control unit 101 marks the virtual track instance that is stored in the redundancy group as invalid in order to assure that the logical location at which this virtual track instance is stored is not accessed in response to another data processor 2' attempting to read or write the same virtual track. Since the modified record data is to be written into this virtual track in the cache memory 113, the copy of the virtual track that resides in the redundancy group is now inaccurate and must be removed from access by the data processors 2 - 2'. At step 711, control returns to the main routine, where at step 712 the control unit 101 cleans up the remaining administrative tasks to complete the write operation. At step 713, the processor 204 updates the free space directory to reflect the additional free space in the logical cylinder that contained the previous track instance and return to an available state at 714 for further read or write operations from data processor 2.

Free Space Collection

Figure 8:
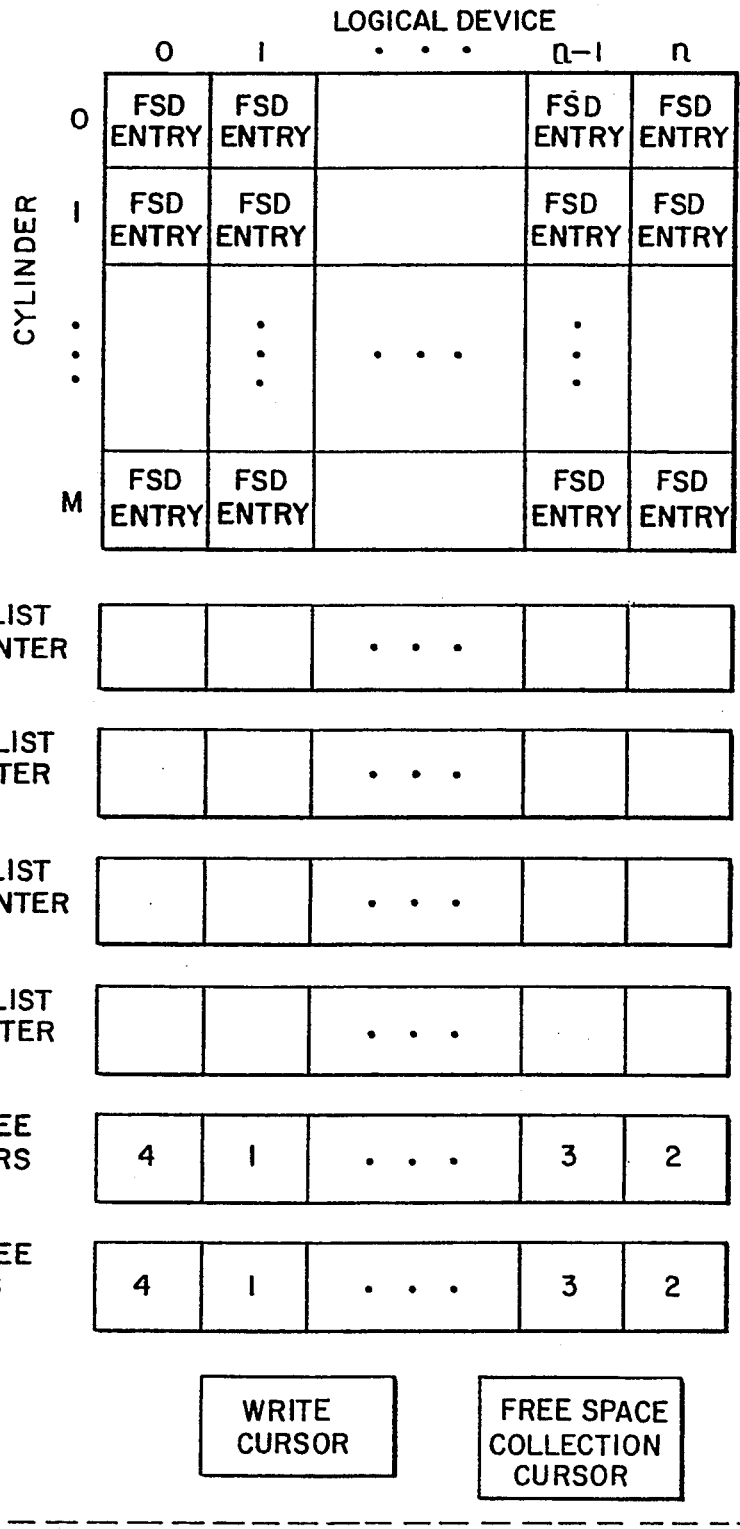
FIG. 8 illustrates a typical free space directory used in the data storage subsystem.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to create completely empty logical cylinders for destaging, the valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated data processor 2 or as part of a free space collection process. In addition, a free space collection cursor is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty and linked into the Free Cylinder List since all of the virtual track instances therein are tagged as obsolete. Additional logical cylinders are collected for free space collection purposes or as data is received from an associated data processor 2 until a complete logical cylinder has been filled. Once a complete logical cylinder has been filled, a new previously emptied logical cylinder is chosen.

Figure 10:
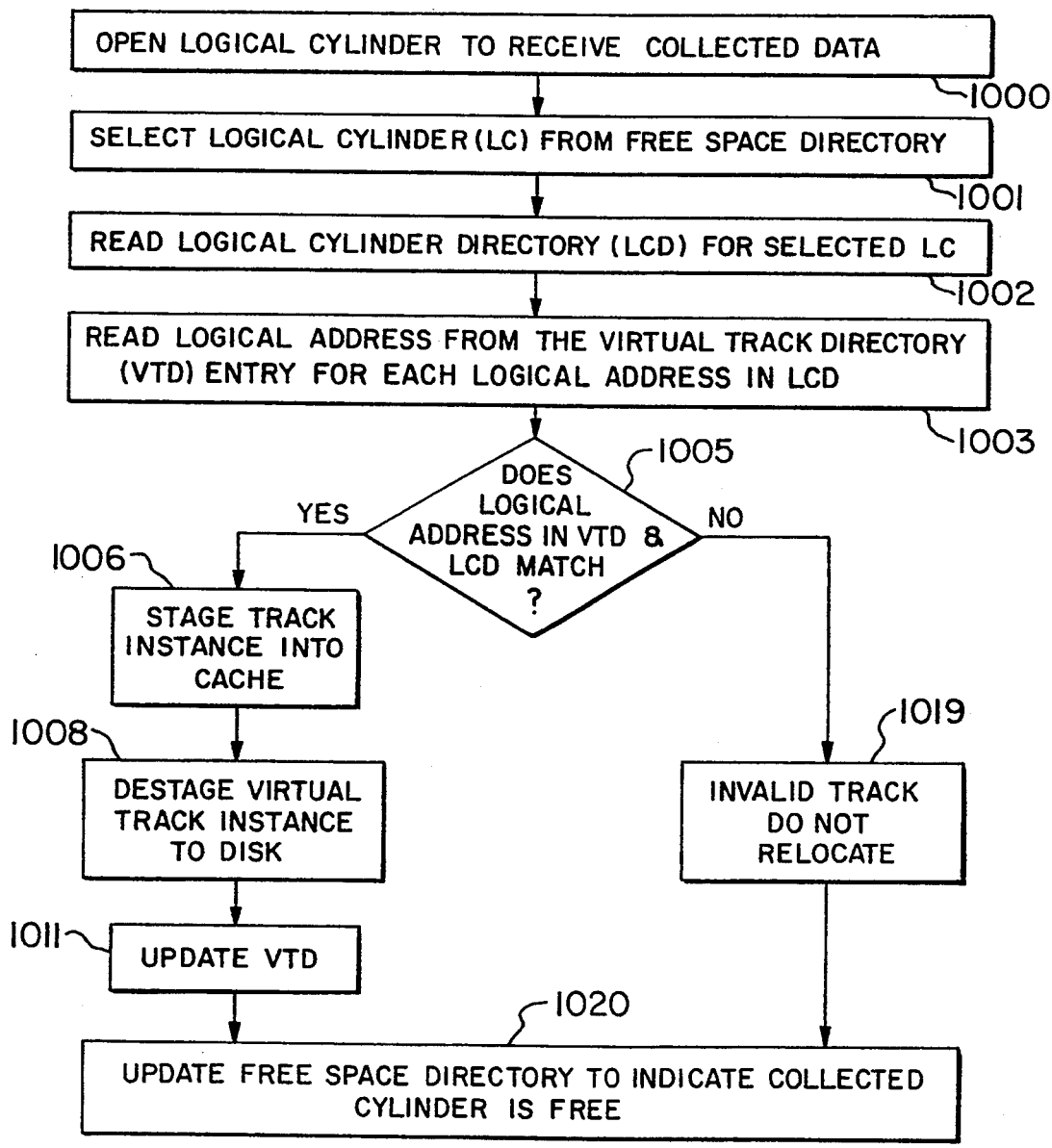
FIGS. 10 and 11 illustrates, in flow diagram form, the basic and enhanced free space collection processes, respectively.

FIG. 10 illustrates in flow diagram form the operational steps taken by processor 204 to implement the free space collection process. When Free Space collection has to be done, the best logical cylinder to collect is the one with the most sectors already free. This leads to the notion of a list of all of the logical cylinders in data storage subsystem 100 ordered by the amount of Free Space each contains. Actually, a list is maintained for each logical device, since it is desirable to balance free space across logical devices to spread virtual actuator contention as evenly as possible over the logical actuators. The collection of lists is called the Free Space Directory; the list for each logical device is called the Free Space List for the logical device. Each free space entry represents a logical cylinder. Each free space directory entry (FIG. 14) contains a forward and backward pointer to create a double linked list as well. Each logical device's Free Space Link List is terminated by head and a tail pointers.

Each logical cylinder contains in its last few sectors a directory of its contents, called its Logical Cylinder Directory (LCD). This directory contains an entry for each virtual track instance contained within the logical cylinder. The entry for a virtual track instance contains the identifier of the virtual track and the identifier of the relative sector within the logical cylinder in which the virtual track instance begins. From this directory, the serial number of the logical cylinder instance, and the Virtual Track Directory, the Free Space Collection Process can determine which virtual track instances are still current in the logical cylinder and therefore need to be moved to make the logical cylinder available for writing new data.

The basic process is initiated at step 1000 when processor 204 opens a logical cylinder to receive data collected, then proceeds to step 1001 where processor 204 selects a Logical Cylinder (LC) for collection based on the number of free logical sectors as listed in the Free Space Directory table of FIG. 8. At step 1002, processor 204 reads the logical cylinder directory for the logical cylinder that was selected at step 1001. Processor 204 then at step 1003 reads the logical address from the virtual track directory (VTD) entry for each virtual track address that is contained in the read logical cylinder directory. At step 1005, processor 204 compares the logical address that was stored in the virtual track directory entry with the logical address that was stored in the logical cylinder directory. If these two addresses do not match, that indicates the track instance is not valid for this virtual address and at step 1017 processor 204 determines that this track should not be relocated and execution exits.

If, at step 1005, processor 204 determines that the virtual address stored in the virtual track descriptor matches the virtual address stored in the logical cylinder directory, at step 1006 the virtual track instance is staged into predetermined location in cache memory 113. Processor 204 destages the virtual track instance to the disk drive subset 103 that contains the logical cylinder used by this free space collection process at step 1008. At step 1011, processor 204 updates the virtual track directory entry and exits at step 1020. At step 1020, processor 204 updates the free space directory to indicate that the collected cylinder is now a free cylinder available for data storage purposes and the data previously contained therein has been collected to a designated logical cylinder and the appropriate mapping table entries have been updated.

Enhanced Free Space Collection

Figure 11:
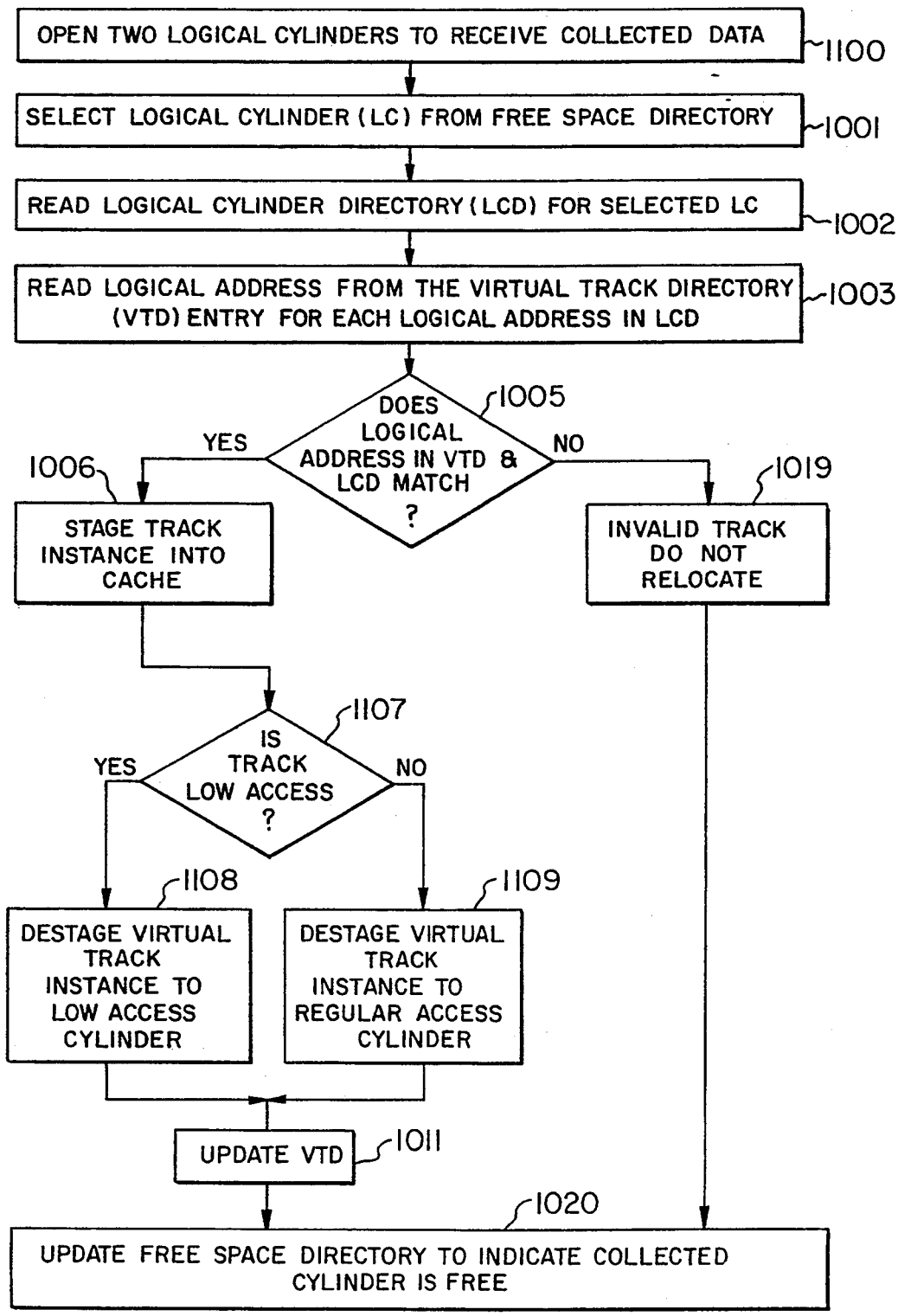

Enhanced Free Space Collection occurs when a cylinder is collected that has already been collected before, as indicated by the Collected Flag in the Logical Cylinder Table (LCT). When data is collected and written to a cylinder separate from the normal destaging cylinder, that data is Read-Only or Low Access relative to the rest of the data in the Logical Cylinder, since any data that is updated is written to new cylinders. Data that is collected a second time is Read-Only or Low Access relative to all the data in the subsystem so it is Archive data. When Free Space Collection collects a cylinder that has not been collected before, the basic Free Space Collection Algorithm, as described in the previous section, is used. When Free Space Collection collects a cylinder that has the Collected or the Archive Flag in the LCT set, the Enhanced Free Space Collection Algorithm is used. FIG. 11 illustrates in flow diagram form the operational steps taken by processor 204 in control unit 101 of the data storage subsystem 100 to perform Enhanced Free Space Collection. The differences between Basic and Enhanced Free Space Collection are minor, but they are important to the hierarchical algorithm since they differentiate data into Low Access and Regular Access Logical Cylinders. In step 1100, we allocate two logical cylinders to receive the data collected during free space collection. One cylinder is used for Low Access Data and the other is used for Regular Access Data. Steps 1001 through 1006 are the same as the basic algorithm. At step 1107 there is a test to determine if the virtual track that has been read from the cylinder being collected is Low Access. The track is low access if the Virtual Track Access Counter from the VTD divided by the age of the logical cylinder is below a low access threshold. The age of the Logical Cylinder is calculated by subtracting the Creation Data/Time (in the LCD) from the Current Data/Time. If the virtual track is low access, the data is written, at step 1108 to the low access logical cylinder. If the virtual track is not low access, the data is written, at step 1109 to the regular access logical cylinder.

Migrate Logical Cylinder

Figure 15:
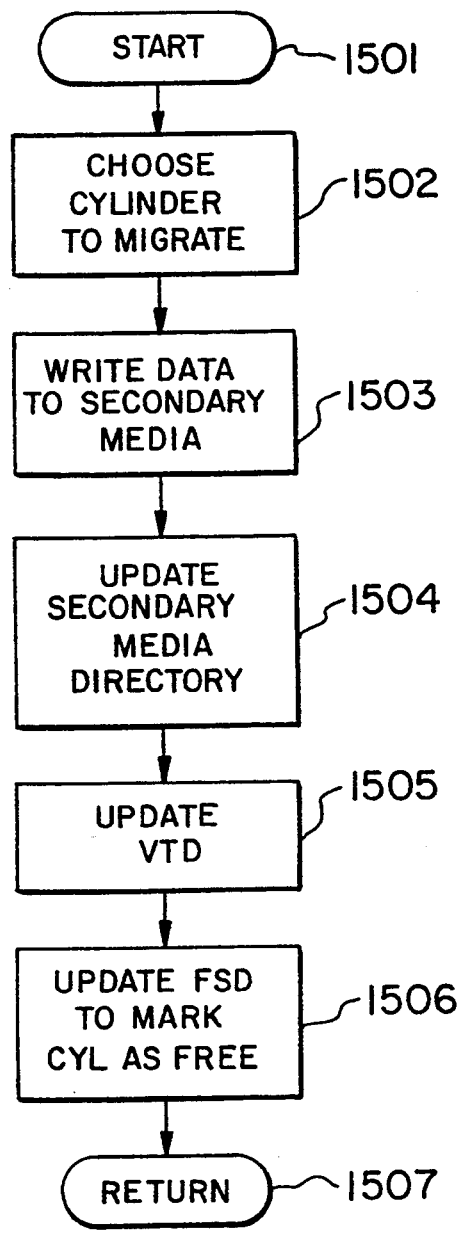
FIG. 15 illustrates, in flow diagram form, the migrate logical cylinder to secondary media process.

Data that is stored in Low Access Cylinders can be migrated to secondary media, such as magnetic tape 10A or bulk disk storage, such as optical media. This is accomplished automatically and dynamically in disk drive array 100 by control unit 101. The data migration process illustrated in FIG. 15 is initiated at step 1501 either periodically by control unit 101 to migrate data to secondary media on a regular basis or on a demand driven basis, such as when the number of available logical cylinders falls below a predetermined threshold or the number of relative versions of a generation data group exceeds a predetermined threshold. In either case, control unit initiates the migration process at step 1501 and selects a logical cylinder at step 1502, identified as a low access cylinder by calculating the access rate from the last three fields in the Free Space Directory Entry as illustrated in FIG. 14. At step 1503, control unit 101 writes the selected logical cylinder to secondary media 10A.

In operation, the selected logical cylinder is read from the redundancy group on which it is stored to cache memory 113 as described above. Once staged to cache memory 113, the selected logical cylinder is transferred to secondary media 10A via tape drive control unit 10 and data channel 20 in well-known manner as described above. Once the data write process is completed, control unit 101 at steps 1504, 1505 updates the status of the secondary media directory and virtual track directory, respectively to indicate the archived nature of the migrated logical cylinder. At step 1506, the logical cylinder in disk drive array 100 that stored the migrated logical cylinder is marked as free in the free space directory. The migration process concludes at step 1507 if no further logical cylinders are available for migration. Otherwise, the process of FIG. 15 is repeated.

Database Example

This example is to illustrate an application of the apparatus of the present invention. This example makes use of a database that is used for payroll purposes and contains the following files:

| File Name | Contents |
| --- | --- |
| Personnel.Salaries | Salary information from personnel system. |
| Accounting.Income.Tax | IRS information regarding a specific payroll. |
| Payroll.Data | Actual payroll data. |
| Payroll.Data.Index | Index to the payroll database. |
| Meta.Data | Data used by the host processor to access data sets on that volume. |

As illustrated in FIG. 1, the data sets are initially located on volumes 11-1, 11-2, 11-3 in a distributed manner in the functional volumes that are directly addressable by the data processor 2. All of these data sets are related in that they are necessary elements of the payroll function. When the user creates the monthly payroll, the user application program 3 makes use of this set of data sets and therefore, all of these data sets must be temporally synchronized. In addition, if a user needed to recreate an old payroll run, due to an error that was found in that payroll run, all of these data sets are again required and these data sets must be temporally coordinated as of the time the user application program 3 ran the payroll which contained the error. The set of data sets must be temporally coordinated for each payroll iteration and therefore archive copies of this set of data sets must be time coordinated as well as the present version of this set of data sets.

To accomplish this, the user defines a snapshot application data group (SADG) that is associated with the above set of data sets. Assume for the purpose of this example, that the user defined this snapshot application data group using the name "PAYROLL.SADG". The records defining the PAYROLL.SADG would be contained in a SADG database on host processor 2 in the file server system catalog 5b. The following tables illustrate typical contents of such a snapshot application data group definition.

TABLE 1

Payroll.SADG Definition

| Consists of | Payroll.Data |
| | Payroll.Data.Index |
| | Personnel.Salaries |
| | Accounting.Income.Tax |
| Keep 12 generations | |
| No expiration | |
| etc. | |

TABLE 2

Payroll.SADG.G0025V01 Definition

As of 6/3/92 at 09:30:45:53
Source Volumes = Snapshot Volumes
V0001 = SV9356, 6 Segments
V0002 = SV9874, 12 Segments
V0003 = SV6783, 4 Segments As can be seen from the example of Table 1, the file server system catalog 5b contains snapshot application data group definition and administration information. In particular, the definition information includes a list of all of the data sets in this set of data group that comprise the PAYROLL.SADG application data group. In addition, administrative information such as the number of versions or instances of the snapshot application data group that should be maintained in file server system 1 is also defined. Further information of an administrative nature can also be stored in this definition file, such as the expiration date beyond which copies of data sets should not be stored, identification of preferred media to store certain instances of a generation data group, etc. The information contained in Table 2 notes the specific mapping of each instance of a snapshot application data group to the snapshot volume and while other tables note the particular physical storage location in file server system 1 wherein the set of data sets is stored. The mapping includes a definition of the snapshot volumes which are outside the functional address space of data processor 2 as well as the formula required to map each of these volumes.

Figure 20:
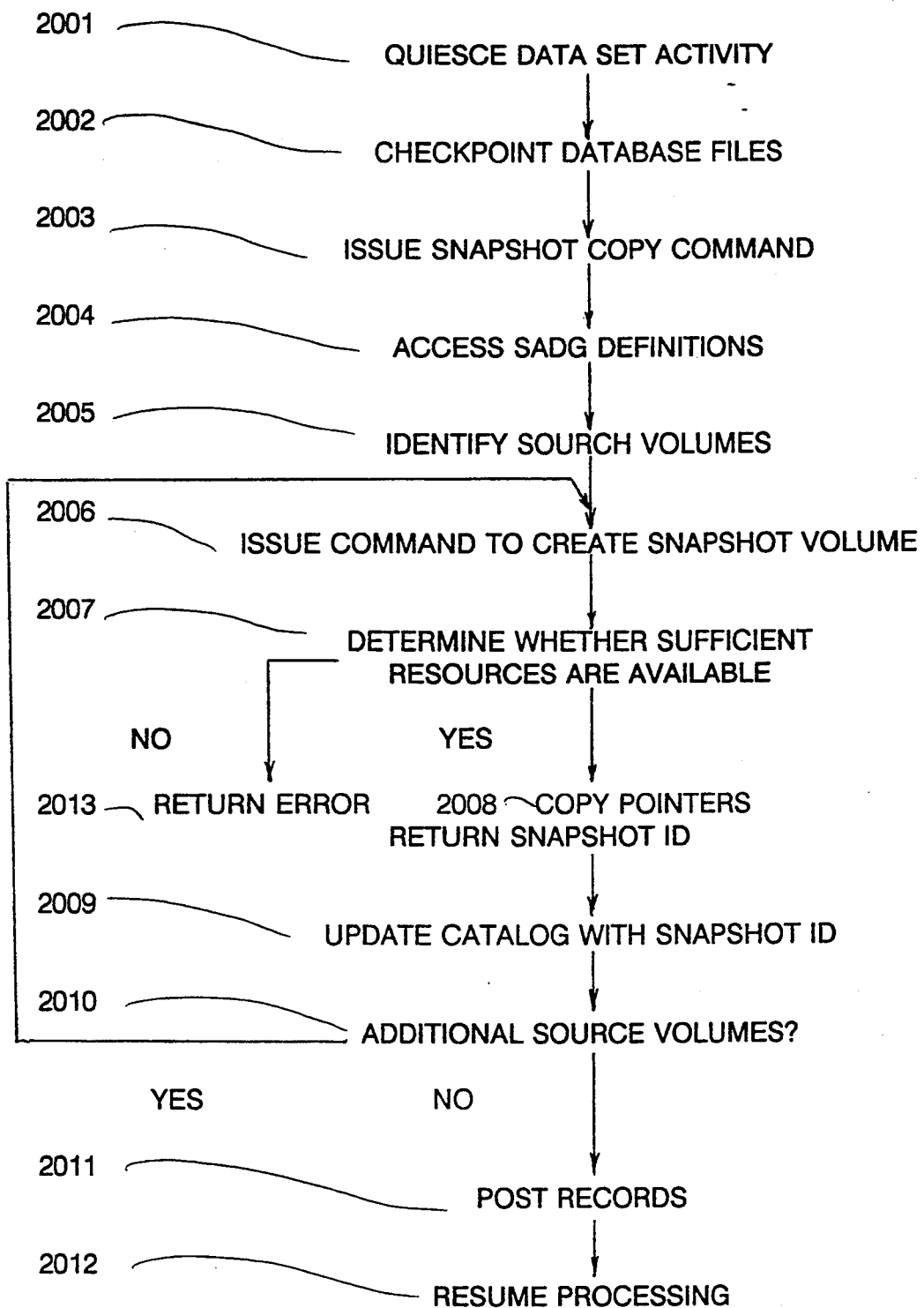
FIG. 20 illustrates in flow diagram form the operational steps taken by the system to create a snapshot copy of an application data group.

To better understand the use of these tables and the apparatus described above, the following description notes the creation of a snapshot copy of a particular snapshot application data group as illustrated in flow diagram form in FIG. 20. At step 2001, the data processor 2 terminates all activity on the data sets that are contained within the selected snapshot application data group that is to be copied. The termination of all activity is necessary because a plurality of user programs 3 can concurrently access the data sets contained within this set of data sets. Therefore, to ensure that a single temporally coordinated copy of the set of data sets is made, the data processor 2 terminates all access to the source data sets within this snapshot application data group as defined in the definitional information noted in Table 1. At step 2002, if any of these data sets in this snapshot application data group are under the control of a database management system, the user program 3 in conjunction with data processor 2 uses the database management system utilities to check point these data sets to the database management system log files to ensure consistency of the snapshot application data group with respect to the database management system that operates on the selected data sets within this snapshot application data group. Processing advances to step 2003 where the user program 3 issues a snapshot copy command which is transmitted to the file server system utility 6. At step 2004, the file server system utility 6 accesses the snapshot application data group definition records that are stored in catalog 5b and as illustrated in Table 1 above to determine the processing options and the administrative handling required for this snapshot application data group. The file server system utility 6 also determines whether the user program 3 has access authorization to this snapshot application data group. At step 2005, the file server system utility 6 determines the identity of the functional volumes that contain the source data sets which, in this example are functional volumes 11-1, 11-2, 11-3 which volumes are identified by the source volume indicia V0001, V0002, V0003, respectively. At step 2006, the file server utility 6 issues a command to file server system 1 to create a snapshot volume for the identified source volume. This is accomplished by transmitting the command through data channel interface 7 over data channel 8 to file server system 1. At step 2007, file server system 1 receives the issued command and accesses the mapping table stored therein to determine the availability of snapshot volume resources to execute the received command. If insufficient resources are available, the file server system 1 returns an error code at step 2013 to the file server system utility 6 which then aborts the snapshot copy operation. If there are sufficient resources available to make a snapshot volume copy of the identified source volume, at step 2008, file server system 1 makes a copy of the pointers associated with the identified source volume as described above. The file server system 1 also returns a snapshot volume identification (SVID) and a number of segments of the snapshot volume that was consumed by the required copy as a measure of resource consumption to the file server system utility 6. At step 2009, the file server system utility 6 updates the catalog information as illustrated in Table 2 to note the correspondence between the source volumes and the snapshot volumes for this particular instance of the snapshot application data group and also notes the number of segments consumed for each of the snapshot volumes. At step 2010, file server system utility 6 determines whether additional source volumes need to be copied. If additional source volumes need to be copies, processing returns to step 2006 and steps 2006–2009 are repeated until file server system utility 6 determines that no further source volumes remain to be copied. At this point, processing advances to step 2011 wherein the file server system utility 6 posts all records and notifies the user application program 3 that a new instance of this snapshot application data group has been created. At step 2012, user application program 3 resumes normal processing of the source data sets. In this manner, the file server system 1 creates copies of the source volumes independent of the data processor 2 and these copies can be maintained on whatever media is designated by file server system 1 as described above. Therefore, the creation of instances of a snapshot application data group take place independent of the data processor 2 thereby reducing the load on the data processor 2 and enabling the file server system 1 to maintain the various instances of each snapshot application data group on various types of media without requiring changes to data processor 2 or the operating system 4 resident thereon. This provides the user with the capability of adding new media to file server system 1 or modifying the operation of file server system 1 without impacting the data processor 2 since the operation of file server system 1 is completely transparent to data processor 2.

User Access to Snapshot Application Data Group

Once various instances of snapshot application data groups have been created by file server system 1, the user can access these instances for a number of reasons in a very controlled manner. The first example is the automatic creation of tape backups of source data sets. This can be done as described above with regard to the archive memory 10 or, alternatively, can be done via data processor 2 in the traditional manner wherein the data processor 2 retrieves the data sets to be archived and transmits them via a data channel to an archive memory which is directly connected to data processor 2. This would be accomplished by mounting the designated snapshot volumes as a functional volume directly addressable by data processor 2 using the file server system utilities. Once these snapshot volumes are mounted, data processor 2 can retrieve the data contained therein and transmit the retrieved data to the archive memory that is directly connected to data processor 2.

A second application of the copies of a snapshot application data group is in the recovery of an application job failure wherein the data can be corrupted during processing. It is a common practice in batch processing jobs to make a copy of the critical data sets prior to update processing in the data processor 2 so that if the processing fails the copy of the data sets can be restored and used to replace the corrupted data on data processor 2. In this application, the user application program 3 transmits commands to the file server system utility immediately prior to transmission of the data to the batch processing program on data processing 2, to create a snapshot copy of the data that will be used in the batch processing. The snapshot copy operation is accomplished as described above and if there is a failure in the batch processing, the customer application program 3 can transmit commands to the file server system utility to request that the snapshot volumes be mounted in place of the source volumes to effectively delete all data on the source volumes and replace them with the data from the snapshot volumes. The meta data is also restored in this process and the customer has some administrative issues to address with regard to maintaining the meta data from the snapshot application data group instance that contained the corrupted data.

A third application of copies of a snapshot application data group is for the movement of data sets from one volume in file server system 1 to another volume that is external to file server system 1 or even to another volume within file server system 1 where file server system 1 is a hierarchical data storage system. The movement of data sets from one volume to another is typically for performance reasons to place the data sets on an appropriate media that corresponds to the needs of data processor 2 and the user application programs 3. The transmission of the data sets from one volume to another can be accomplished through data processor 2 or can be done internally in file server system 1, depending on the location of the target volume.

While a specific embodiment of this invention has been disclosed herein, it is expected that those skilled in the art can design other embodiments that differ from this particular embodiment but fall within the scope of the appended claims.

We claim:

1. A file server system for storing data sets for at least one data processor comprising:
   a plurality of data storage volumes, each of which is capable of storing at least one data set received from a data processor;
   means for maintaining data set pointers indicative of a set of data sets managed as a single data entity consisting of a plurality of interrelated ones of said data sets stored in first available memory space in a plurality of said data storage volumes in said file server system;
   means, responsive to the subsequent receipt of a data set access request from a data processor identifying one of said data sets stored in said set of data sets, for creating a new version of said set of data sets that contains said requested data set, independent of said data set requesting data processor, including:
      means for identifying a physical memory location of each data set in said set of data sets that contains said requested data set as specified by its data set pointer,
      means for generating a new data set pointer, duplicative of said data set pointer, as the data set pointer for said copy of each said data set in said set of data sets,
      means for maintaining data indicative of a correspondence between said data set pointers and said duplicative data set pointers, and
      means for providing said data set requesting data processor with access to said set of data sets via said duplicative data set pointers.

2. The file server system of claim 1 wherein said creating means further comprises:
   means, responsive to said data set requesting data processor modifying data in said requested data set, for copying said requested data set to second available memory space in another of said plurality of data storage volumes;
   means for modifying said duplicative data set pointer to identify said second available memory space as a copy of said requested data set; and
   means for updating said data set pointer to indicate that said data set, stored in said physical memory location is a prior version of said requested data set.

3. The file server system of claim 2 wherein said copying means copies a one of said plurality of said data storage volumes containing said requested data set to second available memory space in another of said plurality of data storage volumes.

4. The file server system of claim 1 wherein said creating means is further responsive to a subsequent receipt of another data set access request from a data processor identifying one of said data sets stored in said set of data sets and said duplicative set of data sets, for creating a third version of said requested data set, independent of said subsequent data set access requesting data processor.

5. The file server system of claim 1 further comprising:
means for storing threshold data indicative of the number of prior versions of each set of data sets that can be stored in said file server system.

6. The file server system of claim 5 further comprising:
means for creating a series of said data set pointers, said series being indicative of a time ordered sequence of prior versions of a particular set of data sets.

7. The file server system of claim 6 further comprising:
means, responsive to a generation of a next duplicative data set pointer for an identified set of data sets, for inserting said next duplicative data set pointer into a one of said series of data set pointers corresponding to said series associated with said identified set of data sets.

8. The file server system of claim 7 further comprising:
means, responsive to said file server system writing a set of data sets identified by one of said duplicative data set pointers in a selected available memory space, for deleting an oldest data set pointer from said series of set of data sets pointers when the number of pointers in said series exceeds said threshold.

9. The file server system of claim 8 further comprising:
cache memory means connected to and interconnecting said data processor and said data storage volumes for storing data sets transmitted therebetween;
archive memory means connected to said cache memory means for storing data sets that were previously stored in said file server system by said data processor;
means, responsive to the writing of a set of data sets in a selected available memory space, for comparing the number of set of data sets pointers in said series of set of data sets pointers, corresponding to said written set of data sets, to said threshold;
means, responsive to said number of set of data sets pointers exceeding said threshold, for signifying an oldest set of data sets pointer in said series of set of data sets pointers as archivable;
means for transferring said archivable set of data sets from said data storage volumes to said cache memory means; and
means for rewriting said cached archivable set of data sets into said archive memory means.

10. The file server system of claim 9 further comprising:
means, responsive to said file server system archiving a set of data sets identified by one of said set of data sets pointers in archive memory means, for deleting the set of data sets pointer corresponding to said archived set of data sets from said series of set of data sets pointers.

11. The file server system of claim 10 further comprising:
means, responsive to said rewriting means, for storing data indicative of the memory location in said archive memory means in which said archived set of data sets is stored.

12. The file server system of claim 10 further comprising:
means for determining the amount of said available memory space in said data storage volumes; and
means for resetting said threshold as a function of said determined available memory space.

13. The file server system of claim 1 further comprising:
means for storing data received from a user of said file server system indicative of the identity of each of said data sets in said set of data sets.

14. The file server system of claim 1 wherein said maintaining means operates independent of said at least one data processor.

15. The file server system of claim 1 wherein said maintaining means comprises:
means for configuring said plurality of data storage devices into a plurality of virtual data storage volumes, each of said virtual data storage volumes being capable of storing at least one data set thereon; and
means for presenting a data storage image of a selected one of said plurality of virtual data storage volumes to each of said at least one data processor.

16. The file server system of claim 15 wherein said presenting means transforms the format of said set of data sets containing said requested data set prior to enabling access to said requested data set by said data set requesting data processor.

17. The file server system of claim 15 wherein said creating means further comprises:
means for transferring said set of data sets containing said requested data set from a first data storage volume to a second data storage volume, wherein said first and second data storage volumes have different physical data storage characteristics.

18. The file server system of claim 1 wherein said maintaining means comprises:
means for configuring said plurality of data storage devices into m virtual data storage volumes, each of said virtual data storage volumes being capable of storing at least one data set thereon, wherein m is a positive integer greater than one; and
means for presenting a data storage image of n data storage volumes directly addressable by said at least one data processor, to said at least one data processor, wherein n is a positive integer greater than zero and less than m.

19. The file server system of claim 18 wherein said maintaining means further comprises:
means, responsive to a one of said at least one data processor requesting access to a selected data set in a set of data sets that is stored on a one of said m data storage volumes that is not directly addressable by said at least one data processor, for mounting said set of data sets containing said requested data set on a one of said n directly addressable data storage volumes.

20. The file server system of claim 19 wherein said maintaining means further comprises:
means for transferring said set of data sets containing said requested data set from a first data storage volume having a first set of physical data storage characteristics to a second data storage volume having a second set of physical data storage characteristics.

21. The file server system of claim 1 wherein said plurality of data storage volumes comprises:
a plurality of disk drives for storing data thereon, a number of said disk drives being configured into at least two redundancy groups, each said redundancy group including n+m of said plurality of disk drives, where n and m are both positive integers with n greater than 1 and m at least equal to 1;
means for storing each of a plurality of data sets received from said data processor on successive ones of said n disk drives in a selected redundancy group;
means, responsive to said storing means storing data sets on all n disk drives in said selected redundancy group, for generating m segments of data redundancy information for said data sets stored on said n disk drives;
means for writing said m segments of redundancy data on to said m disk drives of said selected redundancy group; and
means, responsive to said writing means, for generating a data set pointer for each of said data sets stored on said n disk drives identifying the physical memory location of each data set in said redundancy group.

22. In a file server system having a plurality of data storage volumes, each of which is capable of storing at least one data set received from a data processor, a method for storing data sets for at least one data processor, comprising the steps of:
maintaining data set pointers indicative of a set of data sets managed as a single data entity consisting of a plurality of interrelated ones of said data sets stored in first available memory space in a plurality of said data storage volumes in said file server system;
creating, in response to the subsequent receipt of a data set access request from a data processor identifying one of said data sets stored in said set of data sets, a new version of said set of data sets that contains said requested data set, independent of said data set requesting data processor, including:
identifying a physical memory location of each data set in said set of data sets that contains said requested data set as specified by its data set pointer,
generating a new data set pointer, duplicative of said data set pointer, as the data set pointer for said copy of each said data set in said set of data sets,
maintaining data indicative of a correspondence between said data set pointers and said duplicative data set pointers, and
providing said data set requesting data processor with access to said set of data sets via said duplicative data set pointers.

23. The method of claim 22 wherein said step of creating further comprises:

copying, in response to said data set requesting data processor modifying data in said requested data set, said requested data set to second available memory space in another of said plurality of data storage volumes;
modifying said duplicative data set pointer to identify said second available memory space as a copy of said requested data set; and
updating said data set pointer to indicate that said data set, stored in said physical memory location is a prior version of said requested data set.

24. The method of claim 23 wherein said step of copying copies a one of said plurality of said data storage volumes containing said requested data set to second available memory space in another of said plurality of data storage volumes.

25. The method of claim 22 wherein said step of creating is further responsive to a subsequent receipt of another data set access request from a data processor identifying one of said data sets stored in said set of data sets and said duplicative set of data sets, for creating a third version of said requested data set, independent of said subsequent data set access requesting data processor.

26. The method of claim 22 further comprising the step of:
storing threshold data indicative of the number of prior versions of each set of data sets that can be stored in said file server system.

27. The method of claim 26 further comprising the step of:
creating a series of said data set pointers, said series being indicative of a time ordered sequence of prior versions of a particular set of data sets.

28. The method of claim 27 further comprising the step of:
inserting, in response to a generation of a next duplicative data set pointer for an identified set of data sets, said next duplicative data set pointer into a one of said series of data set pointers corresponding to said series associated with said identified set of data sets.

29. The method of claim 28 further comprising the step of:
deleting, in response to said file server system writing a set of data sets identified by one of said duplicative data set pointers in a selected available memory space, an oldest data set pointer from said series of set of data sets pointers when the number of pointers in said series exceeds said threshold.

30. The method of claim 29, wherein said file server system includes a cache memory connected to and interconnecting said data processor and said data storage volumes for storing data sets transmitted therebetween and an archive memory connected to said cache memory for storing data sets that were previously stored in said file server system by said data processor, the method further comprising the steps of:
comparing, in response to the writing of a set of data sets in a selected available memory space, the number of set of data sets pointers in said series of set of data sets pointers, corresponding to said written set of data sets, to said threshold;
signifying, in response to said number of set of data sets pointers exceeding said threshold, an oldest set of data sets pointer in said series of set of data sets pointers as archivable;

transferring said archivable set of data sets from said data storage volumes to said cache memory; and rewriting said cached archivable set of data sets into said archive memory.

31. The method of claim 30 further comprising the step of:

deleting, in response to said file server system archiving a set of data sets identified by one of said set of data sets pointers in archive memory, the set of data sets pointer corresponding to said archived set of data sets from said series of set of data sets pointers.

32. The method of claim 31 further comprising the step of:

storing, in response to said step of rewriting, data indicative of the memory location in said archive memory in which said archived set of data sets is stored.

33. The method of claim 31 further comprising the steps of:

determining the amount of said available memory space in said data storage volumes; and resetting said threshold as a function of said determined available memory space.

34. The method of claim 22 further comprising the step of:

storing data received from a user of said file server system indicative of the identity of each of said data sets in said set of data sets.

35. The method of claim 22 wherein said step of maintaining operates independent of said at least one data processor.

36. The method of claim 22 wherein said step of maintaining comprises:

configuring said plurality of data storage devices into a plurality of virtual data storage volumes, each of said virtual data storage volumes being capable of storing at least one data set thereon; and presenting a data storage image of a selected one of said plurality of virtual data storage volumes to each of said at least one data processor.

37. The method of claim 36 wherein said step of presenting transforms the format of said set of data sets containing said requested data set prior to enabling access to said requested data set by said data set requesting data processor.

38. The method of claim 36 wherein said step of creating further comprises:

transferring said set of data sets containing said requested data set from a first data storage volume to a second data storage volume, wherein said first and second data storage volumes have different physical data storage characteristics.

39. The method of claim 22 wherein said step of maintaining comprises:

configuring said plurality of data storage devices into m virtual data storage volumes, each of said virtual data storage volumes being capable of storing at least one data set thereon, wherein m is a positive integer greater than one; and presenting a data storage image of n data storage volumes directly addressable by said at least one data processor, to said at least one data processor, wherein n is a positive integer greater than zero and less than m.

40. The method of claim 39 wherein said step of maintaining further comprises:

mounting, in response to a one of said at least one data processor requesting access to a selected data set in a set of data sets that is stored on a one of said m data storage volumes that is not directly addressable by said at least one data processor, said set of data sets containing said requested data set on a one of said n directly addressable data storage volumes.

41. The method of claim 40 wherein said step of maintaining further comprises:

transferring said set of data sets containing said requested data set from a first data storage volume having a first set of physical data storage characteristics to a second data storage volume having a second set of physical data storage characteristics.

42. The method of claim 22 wherein said plurality of data storage volumes comprises a plurality of disk drives for storing data thereon, a number of said disk drives being configured into at least two redundancy groups, each said redundancy group including n+m of said plurality of disk drives, where n and m are both positive integers with n greater than 1 and m at least equal to 1, said method further comprises the steps of:

storing each of a plurality of data sets received from said data processor on successive ones of said n disk drives in a selected redundancy group;

generating, in response to said step of storing data sets on all n disk drives in said selected redundancy group, m segments of data redundancy information for said data sets stored on said n disk drives;

writing said m segments of redundancy data on to said m disk drives of said selected redundancy group; and generating, in response to said step of writing, a data set pointer for each of said data sets stored on said n disk drives identifying the physical memory location of each said data set in said redundancy group.

* * * * *